US011952103B2

(12) United States Patent
Bert et al.

(10) Patent No.: US 11,952,103 B2
(45) Date of Patent: Apr. 9, 2024

(54) HIGH IMPACT-RESISTANT, REINFORCED FIBER FOR LEADING EDGE PROTECTION OF AERODYNAMIC STRUCTURES

(71) Applicant: Helicoid Industries Inc., Indio, CA (US)

(72) Inventors: Anthony Bert, Irigny (FR); Lorenzo Mencattelli, London (GB); David Kisailus, Irvine, CA (US); Chadwick Wasilenkoff, Indio, CA (US)

(73) Assignee: Helicoid Industries Inc., Indio, CA (US)

( * ) Notice: Subject to any disclaimer, the term of this patent is extended or adjusted under 35 U.S.C. 154(b) by 0 days.

(21) Appl. No.: 18/335,079

(22) Filed: Jun. 14, 2023

(65) Prior Publication Data

US 2023/0415882 A1   Dec. 28, 2023

Related U.S. Application Data

(60) Provisional application No. 63/367,085, filed on Jun. 27, 2022.

(51) Int. Cl.
*B64C 11/00* (2006.01)
*B64C 11/20* (2006.01)
(Continued)

(52) U.S. Cl.
CPC .......... *B64C 11/008* (2013.01); *B64C 11/205* (2013.01); *F01D 5/16* (2013.01);
(Continued)

(58) Field of Classification Search
CPC ......... F05D 2300/6034; F05D 2260/96; F05D 2300/603; F03D 1/0675; F03D 1/0688;
(Continued)

(56) References Cited

U.S. PATENT DOCUMENTS 3,761,345 A  *  9/1973  Smith ...................... B32B 5/06
                                                      428/113
3,883,267 A  *  5/1975  Baudier .................. F01D 5/282
                                                      416/241 A
(Continued)

FOREIGN PATENT DOCUMENTS

CA        2309948 A1    6/1999
CA        2804876 C     5/2018
(Continued)

OTHER PUBLICATIONS

"9T Labs raises $4.3 million to advance carbon fiber 3D printing," published on line on Feb. 1, 2020, https://www.3dnatives.com/en/9t-labs-raises-4-3-million-010220205/, (3 pages), retrieved Jun. 15, 2021.
(Continued)

*Primary Examiner* — Topaz L. Elliott
(74) *Attorney, Agent, or Firm* — Eversheds Sutherland (US) LLP; Christopher C. Bolten; Albert K. Heng

(57) ABSTRACT

Systems and methods for protecting an aerodynamic structure, e.g., a wind turbine blade, rotor blade, aerodynamic aerostructure, etc., are provided. Long fiber reinforced composites having a helicoidal architecture with material aligned with a graded hardness and stiffness are used to develop an efficient and highly tailorable leading edge protection (LEP) solution with longer durability than conventional solutions while yielding lighter, and optionally, more environmentally sustainable solutions. At least a portion of the plurality of plies are helicoidally arranged relative to one another to tailor stress wave propagation speed of the aerodynamic blade and to provide load carrying strength for the aerodynamic blade.

20 Claims, 11 Drawing Sheets

(51) Int. Cl.
  *F01D 5/16* (2006.01)
  *F01D 5/28* (2006.01)
  *F03D 1/06* (2006.01)

(52) U.S. Cl.
  CPC ............ *F01D 5/288* (2013.01); *F03D 1/0688* (2023.08); *F05D 2260/96* (2013.01); *F05D 2300/603* (2013.01); *F05D 2300/6034* (2013.01)

(58) Field of Classification Search
  CPC ......... B63B 5/24; B63B 5/242; B64C 11/008; B64C 11/205; F01D 5/16; F01D 5/288; B32B 2603/00; B32B 5/12; B29L 2031/085
  See application file for complete search history.

(56) References Cited

U.S. PATENT DOCUMENTS

| | | | |
|---|---|---|---|
| 4,022,547 A * | 5/1977 | Stanley | F01D 5/282 416/241 A |
| 4,405,076 A | 9/1983 | Lines, Jr. et al. | |
| 5,225,812 A | 7/1993 | Faghri | |
| 5,437,450 A | 8/1995 | Akatsuka et al. | |
| 5,447,765 A | 9/1995 | Crane | |
| 5,476,189 A | 12/1995 | Duvall et al. | |
| 5,772,938 A | 6/1998 | Sharp | |
| 6,641,893 B1 | 11/2003 | Suresh et al. | |
| 7,270,209 B2 | 9/2007 | Suess | |
| 7,641,949 B2 | 1/2010 | DeLay et al. | |
| 7,802,968 B2 * | 9/2010 | Jacobsen | F03D 1/065 416/241 A |
| 7,874,937 B2 | 1/2011 | Chao | |
| 8,012,291 B2 | 9/2011 | Kisch et al. | |
| 8,074,826 B2 | 12/2011 | Cronin et al. | |
| 8,187,402 B2 | 5/2012 | Heinrich et al. | |
| 8,192,853 B2 | 6/2012 | Hilmas et al. | |
| 8,460,777 B2 | 6/2013 | Long | |
| 8,657,146 B2 | 2/2014 | Schultheis et al. | |
| 8,728,263 B2 | 5/2014 | Velicki et al. | |
| 8,931,661 B2 | 1/2015 | Kuroiwa et al. | |
| 8,932,695 B1 | 1/2015 | Villarreal et al. | |
| 8,986,810 B2 | 3/2015 | Grunden et al. | |
| 9,114,588 B2 | 8/2015 | Oefner | |
| 9,199,429 B2 | 12/2015 | Tsai | |
| 9,296,174 B2 * | 3/2016 | Tsai | B29C 70/30 |
| 9,343,734 B2 | 5/2016 | Hwang et al. | |
| 9,452,587 B2 * | 9/2016 | Kisailus | B32B 5/26 |
| 9,822,228 B2 | 11/2017 | Arai et al. | |
| 10,099,445 B2 | 10/2018 | Kismarton | |
| 10,221,832 B2 * | 3/2019 | Wetzel | B32B 7/03 |
| 10,247,523 B2 | 4/2019 | Christoph et al. | |
| 10,472,472 B2 | 11/2019 | Wilenski et al. | |
| 10,576,335 B2 | 3/2020 | Greaney et al. | |
| 10,589,474 B2 | 3/2020 | Tsai et al. | |
| 10,603,873 B2 | 3/2020 | Garcia et al. | |
| 10,604,226 B2 | 3/2020 | May et al. | |
| 10,632,353 B2 | 4/2020 | Mordasini et al. | |
| 11,346,499 B1 | 5/2022 | Joubert Des Ouches et al. | |
| 11,376,812 B2 * | 7/2022 | McCarville | B33Y 80/00 |
| 2007/0025859 A1 * | 2/2007 | Jacobsen | F03D 1/065 416/230 |
| 2007/0036659 A1 * | 2/2007 | Hibbard | B29C 66/1282 416/233 |
| 2007/0205201 A1 | 9/2007 | Cundiff et al. | |
| 2008/0145647 A1 | 6/2008 | Ganguli et al. | |
| 2008/0159871 A1 * | 7/2008 | Bech | F03D 1/0675 416/241 A |
| 2008/0241443 A1 | 10/2008 | Liu et al. | |
| 2009/0140098 A1 | 6/2009 | Lengsfeld et al. | |
| 2009/0314785 A1 | 12/2009 | Cronin et al. | |
| 2010/0099513 A1 | 4/2010 | Chao et al. | |
| 2010/0282404 A1 | 11/2010 | Ellis | |
| 2012/0048865 A1 | 3/2012 | Eihusen et al. | |
| 2012/0177872 A1 * | 7/2012 | Tsai | B32B 5/28 428/113 |
| 2014/0033411 A1 * | 2/2014 | Kisailus | B32B 5/12 428/113 |
| 2014/0099484 A1 | 4/2014 | Roberts, III et al. | |
| 2014/0119940 A1 * | 5/2014 | Krishnamurthy | F03D 1/0675 29/889.7 |
| 2014/0193269 A1 * | 7/2014 | Wetzel | B32B 7/03 428/113 |
| 2014/0335300 A1 | 11/2014 | Tsai | |
| 2014/0363304 A1 * | 12/2014 | Murooka | B32B 5/12 416/229 R |
| 2015/0030805 A1 * | 1/2015 | Tsai | B32B 5/06 428/110 |
| 2016/0009368 A1 | 1/2016 | Kismarton | |
| 2016/0031182 A1 | 2/2016 | Quinn et al. | |
| 2016/0177920 A1 | 6/2016 | Donazar Moriones et al. | |
| 2016/0288429 A1 * | 10/2016 | Bergstrom | B29B 11/16 |
| 2017/0021575 A1 * | 1/2017 | Hansen | B29C 70/342 |
| 2017/0028652 A1 | 2/2017 | Garcia Nieto et al. | |
| 2017/0058863 A1 * | 3/2017 | Yarbrough | B29C 65/505 |
| 2018/0094525 A1 * | 4/2018 | Roberts | F04D 29/542 |
| 2018/0148154 A1 | 5/2018 | Rocher Pastor et al. | |
| 2018/0162101 A1 | 6/2018 | Stickler et al. | |
| 2019/0128475 A1 | 5/2019 | Roland et al. | |
| 2019/0234420 A1 * | 8/2019 | Bryant, Jr. | F04D 29/388 |
| 2019/0263532 A1 | 8/2019 | Wilenski et al. | |
| 2021/0123568 A1 | 4/2021 | Kronholz et al. | |
| 2021/0316528 A1 * | 10/2021 | McCarville | B32B 19/02 |
| 2021/0339499 A1 | 11/2021 | Mencattelli et al. | |
| 2022/0381400 A1 | 12/2022 | Mencattelli et al. | |
| 2022/0396051 A1 * | 12/2022 | Hansen | B29C 70/24 |

FOREIGN PATENT DOCUMENTS

| | | | |
|---|---|---|---|
| CN | 101524903 A | 9/2009 | |
| CN | 101633254 A | 1/2010 | |
| CN | 102145553 A | 8/2011 | |
| CN | 102336034 A | 2/2012 | |
| CN | 103818606 A | 5/2014 | |
| CN | 104943185 A | 9/2015 | |
| CN | 104985902 A | 10/2015 | |
| CN | 204845063 U | 12/2015 | |
| CN | 105235295 A | 1/2016 | |
| CN | 105667057 A | 6/2016 | |
| CN | 205854774 U | 1/2017 | |
| CN | 106739192 A | 5/2017 | |
| CN | 106739237 A | 5/2017 | |
| CN | 107187124 A | 9/2017 | |
| CN | 107187131 A | 9/2017 | |
| CN | 107891631 A | 4/2018 | |
| CN | 108832156 A | 11/2018 | |
| CN | 110145984 A | 8/2019 | |
| CN | 209700003 U | 11/2019 | |
| CN | 111779705 A * | 10/2020 | |
| DE | 20102209 U1 | 6/2002 | |
| DE | 202015004314 U1 | 8/2015 | |
| DE | 102014215693 A1 * | 2/2016 | ........... F01D 25/162 |
| DE | 102015225348 A1 | 6/2017 | |
| DE | 102016216310 A1 | 3/2018 | |
| DE | 102017207498 A1 | 11/2018 | |
| EP | 1029195 B1 | 4/2003 | |
| EP | 2110056 A1 | 10/2009 | |
| EP | 2154416 A1 | 2/2010 | |
| KR | 20100113865 A | 10/2010 | |
| KR | 20160120247 A | 10/2016 | |
| KR | 102247198 B1 | 4/2021 | |
| WO | WO-2006037083 A2 | 4/2006 | |
| WO | WO-2007083641 A1 | 7/2007 | |
| WO | WO-2007136755 A2 | 11/2007 | |
| WO | WO-2008018421 A1 | 2/2008 | |
| WO | WO-2008098771 A1 | 8/2008 | |
| WO | WO-2008098900 A2 | 8/2008 | |
| WO | WO-2008141687 A2 | 11/2008 | |
| WO | WO-2008157013 A1 | 12/2008 | |
| WO | WO-2009058500 A1 | 5/2009 | |
| WO | WO-2009127852 A1 | 10/2009 | |
| WO | WO-2010058196 A1 | 5/2010 | |

(56) References Cited

FOREIGN PATENT DOCUMENTS

| WO | WO-2010065330 A1 | 6/2010 |
|---|---|---|
| WO | WO-2010144010 A1 | 12/2010 |
| WO | WO-2011090396 A1 | 7/2011 |
| WO | WO-2011107733 A2 | 9/2011 |
| WO | WO-2011121340 A1 | 10/2011 |
| WO | WO-2011128667 A1 | 10/2011 |
| WO | WO-2012024023 A1 | 2/2012 |
| WO | WO-2012060971 A1 | 5/2012 |
| WO | WO-2012091897 A1 | 7/2012 |
| WO | WO-2012096696 A1 | 7/2012 |
| WO | WO-2012126897 A1 | 9/2012 |
| WO | WO-2013004671 A1 | 1/2013 |
| WO | WO-2013092211 A1 | 6/2013 |
| WO | WO-2013135515 A1 | 9/2013 |
| WO | WO-2013162989 A1 | 10/2013 |
| WO | WO-2013173035 A1 | 11/2013 |
| WO | WO-2014001652 A1 | 1/2014 |
| WO | WO-2014009314 A1 | 1/2014 |
| WO | WO-2014011293 A2 | 1/2014 |
| WO | WO-2014026448 A1 | 2/2014 |
| WO | WO-2014071306 A1 | 5/2014 |
| WO | WO-2014085802 A1 | 6/2014 |
| WO | WO-2014088962 A1 | 6/2014 |
| WO | WO-2014099149 A1 | 6/2014 |
| WO | WO-2014151658 A1 | 9/2014 |
| WO | WO-2014197039 A2 | 12/2014 |
| WO | WO-2015017006 A1 | 2/2015 |
| WO | WO-2015044099 A1 | 4/2015 |
| WO | WO-2015047480 A2 | 4/2015 |
| WO | WO-2015073537 A1 | 5/2015 |
| WO | WO-2015088594 A1 | 6/2015 |
| WO | WO-2015091794 A1 | 6/2015 |
| WO | WO-2015095396 A1 | 6/2015 |
| WO | WO-2015167630 A1 | 11/2015 |
| WO | WO-2015188963 A1 | 12/2015 |
| WO | WO-2016020414 A1 | 2/2016 |
| WO | WO-2016048885 A1 | 3/2016 |
| WO | WO-2016154089 A1 | 9/2016 |
| WO | WO-2016193758 A1 | 12/2016 |
| WO | WO-2017027598 A1 | 2/2017 |
| WO | WO-2017048975 A1 | 3/2017 |
| WO | WO-2017095810 A1 | 6/2017 |
| WO | WO-2017103669 A1 | 6/2017 |
| WO | WO-2017117083 A1 | 7/2017 |
| WO | WO-2017117383 A1 | 7/2017 |
| WO | WO-2017137278 A1 | 8/2017 |
| WO | WO-2017180387 A1 | 10/2017 |
| WO | WO-2017198167 A1 | 11/2017 |
| WO | WO-2017207611 A1 | 12/2017 |
| WO | WO-2018093520 A2 | 5/2018 |
| WO | WO-2018132360 A1 | 7/2018 |
| WO | WO-2018187186 A1 | 10/2018 |
| WO | WO-2019031589 A1 | 2/2019 |
| WO | WO-2019133463 A1 | 7/2019 |
| WO | WO-2019203893 A2 | 10/2019 |
| WO | WO-2022026215 A2 * | 2/2022 |
| WO | WO-2022132228 A1 | 6/2022 |

OTHER PUBLICATIONS

Abir et al., "On the improved ballistic performance of bio-inspired composites," Composites Part A: Applied Science and Manufacturing, 123:59-70 (Aug. 2019).
Abrate. S. "Impact on laminated composite materials," Applied Mechanics Review, 44(4):155-190, (Apr. 1991).
Agarwal, et al., "Impact-Resistant and Tough Helicoidally Aligned Ribbon Reinforced Composites with Tunable Mechanical Properties via Integrated Additive Manufacturing Methodologies," ACS Appl. Polym. Mater., 2(8):3491-3504 (Jul. 2020).
Ali-Sawalmih, et al., "Microtexture and Chitin/Calcite Orientation Relationships in the Mineralized Exoskeleton of the American Lobster," Adv. Funct. Mater., 18(20):3307-3314 (Oct. 2008).
Amacher, et al., "Thin Ply Composites: Experimental Characterization and Modeling," The 19th International Conference of Composite Material, Canada, Jul. 28-Aug. 2, 2013, 13 Pages.
Amorim, et al., "Bioinspired approaches for toughening of fiber reinforced polymer composites," Materials and Design, p. 109336 (Nov. 2020).
Apichattrabrut et al., "Helicoid Composites," Mechanics of Advances Materials and Structures, 13:61-76 (Aug. 2006).
ASTM International "Standard Test Method for Measuring the Damage Resistance of a Fiber- Reinforced Polymer Matrix Composites to a Drop-Weight Impact Event," ASTM D7136/D7136M-15, 16 Pages (Mar. 2015).
Belingardi et al., "Material characterization and impact performance of Semi Impregnated Micro-Sandwich structures, SIMS," Politenico di Torino, 26 Pages.
Bouligand, Y. "Twisted Fibrous Arrangements in Biological Materials and Cholesteric Mesophases," Tissue & Cell, 4(2):189-217, (1972).
Bullegas et al., "Towards quasi isotropic laminates with engineered fracture behaviour for industrial applications," Composites Science and Technology, 165:290-306, (Jul. 2018).
Campbell, F.C., "Manufacturing Process for Advanced Composites," Elsevier Science Ltd, (ISBN: 1856174158), Parts 1-4, (2004).
Campbell, F.C., "Manufacturing Technology for Aerospace Structural Materials," Part 1 pp. 1-300 & Part 2 pp. 301-617, (2006).
Chen, et al., "Spiry-layup model of Rutelidae cuticle," Computational Material Science, 30:517-522 (Feb. 2004).
Chen, et al., "Structure and mechanical properties of crab exoskeletons," Acta Biomaterialia, 4:587-596 (Jan. 2008).
Cheng, et al., "Image Analysis of two crustacean exoskeletons and implications of the exoskeletal microstructure on the mechanical behavior," J. of Materials Research, 23(11):2854-2872 (2008).
Cheng, et al., "Mechanical behavior of bio-inspired laminated composites," Composites: Part A, 42:211-220 (2011).
Cheng, et al., "Mechanics-based Analysis of Selected Features of the Exoskeletal Microstructure of Popillia Japonica," J. of Materials Research, 24(11):3253-3267 (2009).
Chew, et al., "Improving the mechanical properties of natural fiber reinforced laminates composites through Biomimicry," Composite Structures, 258:113208 (2021).
Cugnoni, et al., "Thin ply technology advantages: an overview of the TPT-TECA project," May 2013 (25 pages).
"D30 Impact Protection—Nothing protects better that D30," https://www.d3o.com, retrieved Feb. 5, 2021 (6 pages).
Evans T. H., "Development of an on-board compressed gas storage system for hydrogen powered vehicle applications," Graduate Theses, Dissertations, and Problem Reports, 4460 (2009).
Feilden, et al., "3D Printing Bioinspired Ceramic Composites," Scientific Reports, 7:13759 (Oct. 2017).
Fields, R. E., "Introduction to Testing and Certification," ASM Handbook, 21:733 (2001).
Fischer, et al., "Crack driving force in twisted plywood structures," Acta Biomaterialia, 55:349-359, Apr. 2017.
Foreman, et al., "An Integrated System for Improved Damage Resistance and Lightning Strike Protection in Composite Structures," 16th International Conference of Composite Materials, Jul. 8-13, 2007, (7 pages).
Gao, et al., "Spiral interface: A reinforcing mechanism for laminated composite materials learned from nature," Journal of Mechanics and Physics of Solids, 109:252-263 (Sep. 2017).
Ginzberg, et al., "Damage tolerance of bio-inspired helicoidal composites under low velocity impact," Composite Structures, 161:187-203 (2017).
Gnoli, et al., "Homogenization and Equivalent Beam Model for Fiber-Reinforced Tubular Profiles," Materials, 13:2069 (1-30), (Apr. 2020).
Green, P.A., "Contest with deadly weapons: telson sparring in mantis shrimp (Stamatopoda)," Biol. Lett., 11:20150558 (4 Pages) (Aug. 2015).
Greenfeld, I., "Nested helicoids in biological microstructures," Nature Communications, 11:224 (2020).
Grunenfelder, et al., "Crustacean-Derived Biomimetic Components and Nanostructured composites," Small, 10(16):3207-3232, Aug. 2014.

(56) References Cited

OTHER PUBLICATIONS

Grunenfelder, L.K., "Bio-inspired impact-resistant composites," Acta Biomaterialia, 10:3997-4008 (Mar. 2014).
Guarin-Zapata, et al., "Bandgap tuning in bioinspired helicoidal composites," Journal of the Mechanics and Physics of Solids, 131:344-357 (Jul. 2019).
Guarin-Zapata, et al., "Shear Wave Filtering in Naturally-Occurring Bouligand Structures," Acta Biomaterialia, 19 Pages, (May 2015).
Han, et al., "Mechanical properties of a novel dactyl-inspired green-composite sandwich structures with basalt fiber," Journal of Sandwich Structures & Materials, 1-11 (2019).
Han, et al., "Study on impact resistance behaviors of a novel composite laminate with basalt fiber for helicoidal-sinusoidal bionic structure of dactyl club of mantis shrimp," Composites Part B, 191:107976 (11 Pages) (Mar. 2020).
Hazzard, M.K., "Effect of fiber orientation on the low velocity impact response of thin Dyneema composite laminates," International Journal of Impact Engineering, 100:35-45 (2017).
Hundley, et al., "Multi-Scale Modeling of Metal-Composite Interfaces in Titanium-Graphite Fiber Metal Laminates Part I: Molecular Scale," Open Journal of Composite Materials, 1(1):19-37, (Oct. 2011).
International Search Report & Written Opinion dated Apr. 7, 2022 in Int'l PCT Patent Appl. Serial No. PCT/US2021/036162 (0310).
International Search Report & Written Opinion dated Sep. 9, 2022 in Int'l PCT Patent Appl. Serial No. PCT/US2022/072542 (0410).
JEC Group, "Printing continuous fiber in true 3D," https://www.jeccomposites.com/knowledge/internationa-composites-news/printing-continuous-carbon-fibre-true-3d., retrieve Feb. 5, 2021.
Jiang et al., "Low-velocity impact resistance behaviors of bio-inspired helicoidal composite laminates with non-linear rotation angle based layups," Composite Structures, 214:463-475 (Feb. 2019).
Johnson, L.B., "Protective Shells for Composite Overwrapped Pressure Vessels," Tech Briefs, https://www.techbriefs.com/component/content/article/tb/pub/techbriefs/materials/6742, 4 pages (Feb. 2000).
Kamarudin, et al., "Effect of high Velocity Ballistic Impact on Pretensioned Carbon Fibre Reinforced Plastics (CFRP) Plates," Material Science and Engineering, 165:012005 1-7 (2017).
Karthikeyan et al., "Optimal fibre architecture of soft-matrix ballistic laminates," International Journal of Impact Engineering, 88:227-237 (2016).
Korbelin, et al., "Damage tolerance and notch sensitivity of bio-inspired thin-ply Bouligand structures," Composites Part C: Open Access, 5:100146 1-14 (Apr. 2021).
Li, N., Rapid Microwave Additive Manufacturing of Continuous Carbon Fiber Reinforced Bionic Plastics,: Proceedings of JEC Group's Fiber & Nano-Reinforced Materials Fill Gaps in Additive Manufacturing, (15 Pages), Jun. 2020.
Lim, et al., "Comparison of Tensile and Impact Absorption properties of Bio-Inspires Helicoidal stacked with Cross-Ply Stacked Carbon Fiber Laminate," Materials Science and Engineering, 744:012018, 8 Pages (2020).
Liu, et al., "Effects of inter-ply angles on the failure mechanics in bioinspired helicoidal laminates," Composites Science and Technology, 165"282-289 (Jul. 2018).
Liu, et al., "Bio-inspired Laminates of Different Material Systems," Journal of Applied Mechanics, 87:031007-1-031007-7 (Mar. 2020).
Liu, et al., "Failure mechanisms in bioinspired helicoidal laminates," Composites Science and Technology, 157:99-106, (Feb. 2018).
Liu, et al., "Healable bio-inspired helicoidal laminates," Composites Part A, 137:106024, 7 Pages (Jun. 2020).
Liu, et al., "Improving laminates through non-uniform inter-ply angles," Composites Part A, 127:105625, 9 Pages (Sep. 2019).
Liu, et al., "The response of bio-inspired helicoidal laminates to small projectile impact," International Journal of Impact Engineering 142:103608, 16 Pages (Apr. 2020).

Melaibari, et al., "Bio-inspired composite laminate design with improved out-of-plane strength and ductility," Composites Part A, 144:106362, 12 Pages, (Feb. 2021).
Mencattelli, et al., "Herringbone-Bouligand CFRP structures: Anew tailorable damage- tolerant solution for damage containment and reduced delaminations," Composites Science and Technology, 190:108047, 1-13 (Jan. 2020).
Mencattelli, et al., "Realising bio-inspired impact damage-tolerant thin-ply CFRP Bouligand structures via promoting diffused sub-critical helicoidal damage," Composites Science & Technology, 182:107684, 1-13 (Jun. 2019).
Mencattelli, et al., "Ultra-thin-ply CFRP Bouligand bio-inspired structures with enhanced load-bearing capacity, delayed catastrophic failure and high energy dissipation capability," Composites Part A, 129:105655, 1-15 (2020).
Milliron, G., "Lightweight Impact-Resistance Composite Materials: Lessons from Mantis Shrimp," UC Riverside Electronic Theses and Dissertations, 143 Pages, (Sep. 2012).
Miracle, D. B., "Aeronautical Applications of Metal-Matrix Composites," ASM Handbook, 21:1043-4049 (2001).
Miracle, D.B., "ASM Handbook, vol. 21: Composites," ASM International, (portions missing), (ISBN:0-87170-703-9) Part 1 of 4, (2001).
Miracle, D.B., "ASM Handbook, vol. 21: Composites," ASM International, (portions missing), (ISBN:0-87170-703-9) Part 2 of 4, (2001).
Miracle, D.B., "ASM Handbook, vol. 21:Composites," ASM International, (portions missing), (ISBN:0-87170-703-9) Part 3 of 4, (2001).
Miracle, D.B., "ASM Handbook, vol. 21:Composites," ASM International, (portions missing), (ISBN:0-87170-703-9) Part 4 of 4, (2001).
Mo, et al., "Spatial programming of defect distributions to enhance material failure characteristics," Extreme Mechanics Letters, 34:100598, 1-8 (2020).
N12 NanoStitch TM, NanoStitch Interlaminar Reinforcement, YouTube, assessed on Feb. 5, 2021, ,URL:https://www.youtube.com/watch?v=og67m9v0mkM&feature=emb__ogo, 5 pages, (Mar. 2015).
Nebe, et al., "Analysis on the mechanical response of composite pressure vessel during internal pressure loading: FE modelling and experimental correlation," Composites Part B, 1-18 (2020).
Nieri, et al., "Semi impregnated micro-sandwich structures," Presented at the SAMPLE Europe 29th International Conference and Forum—SEICO 08, Mar. 31-Apr. 2, 8 Pages, (2008).
NPROXX, "Hydrogen tank train mountings, " https://www.nproxx.com/hydrogen-tank-train-mountings/ , 2 Pages (Jul. 2019).
Ouyang, et al., "Identifying optimal rotating pitch angels in composites with Bouligand structure," Composites Communications, 23:100602, 1-5 (2021).
Patek, et al., "Extreme impact and cavitation forces of a biological hammer: strike forces of the peacock mantis shrimp Odontodactylus scyllarus," The Journal of Experimental Biology, 208:3655-3664 (Aug. 2005).
Pinto et al., "Bioinspired twisted composites based on Bouligand structures," Proceedings of SPIE, 9797:97970E-1-97970E-13 (Apr. 2016).
Plocher, et al., "Learning from nature: Bio-inspiration for Damage-tolerant high-performance fibre-reinforced composites," Composites Science and Technology, 208:108669, 1-30 (Jan. 2021).
Raabe, et al., "Microstructure and crystallographic texture of the chitin-protein network in the biological composite material of the exoskeleton of the lobster *Homarus americanus*," Materials Science and Engineering A, 421:143-153 (2006).
Raabe, et al., "The crustacean exoskeleton as an example of a structurally and mechanically graded biological nanocomposite material," Acta Materialia, 53:4281-4292 (May 2005).
Raphel, et al., "Bioinspired designs for shock absorption, based upon nacre and Bouligand structures," SN Applied Sciences, 1:1022, 12 Pages (Aug. 2019).
Ribbans et al., "A bioinspired study on the interlaminar shear resistance of helicoidal fiber structures," Journal of the Mechanical Behavior of Biomedical Materials, 56:57-67 (2016).

(56) References Cited

OTHER PUBLICATIONS

Shang, et al., "Crustacean-inspired helicoidal laminates," Composites Science and Technology, 128:222-232 (Apr. 2016).
Sloan, J., (editor), "Vitrimers: The reprocessable thermoset," Composites World, [article, online], [retrieved Feb. 4, 2021], retrieved from the Internet—https://www.compositesworld.com/articles/vitrimers-the-reprocessable-thermoset—4 Pages, (Sep. 2020).
Suksangpanya, et al., "Crack twisting and toughening strategies in Bouligand architectures," International Journal of Solids and Structures, 150:83-106 (Apr. 2018).
Suksangpanya, et al., "Twisting cracks in Bouligand structures," Journal of the Mechanical Behavior of Biomedical Materials, 76:38-57 (Jun. 2017).
Tan, et al., "A bioinspired study on the compressive resistance of helicoidal fibre structures," Proc. R. Soc. A, 473:20170538. 1-15 (Sep. 2017).
The Markets: Pressure vessels, Composites World, https://www.compositesworld.com/articles/the-markets-pressure-vessels-2021, 9 Pages, (2021).
Torres, et al., "Manufacture of green-Composites Sandwich Structures with Basalt Fiber and Bioepoxy Resin," Advances in Material Science and Engineering, 2013-Article ID 214506, 1-9 (May 2013).
Trimech Blog, "3D Printing Composite Materials: Micro Automated Fiber Placement," [blog, online], [retrieved Feb. 5, 2021], retrieved from the Internet , URL:https://blog.trimech.com/3d-printing-composite-materials-micro-automated-fiber-placement#:~:text=3D%20Printing%20Composite%20Materials%3A%20Micro%20Automated%20Fiber%20Placement,-By%20TriMech%20on&text=Automated%20Fiber%20Placement%20(AFP)%20is,also%20contains%20non%2Dmetallic%20fibers, 7Pages, (Feb. 2020).
Vargas-Gonzalez, et al., "Examining the Relationship Between Ballistic and Structural Properties of Lightweight Thermoplastic Unidirectional Composite Laminates," ARL-RP-0329, 1-18 (Aug. 2011).
Vargas-Gonzalez, et al., "Hybridized composite architecture for mitigation of non-penetrating ballistic trauma," International Journal of Impact Engineering, 86:295-306 (Aug. 2015).
Vargas-Gonzalez, et al., "Impact and Ballistic Response of Hybridized Thermoplastic laminates," ARL-MR-0769, 1-26 (Feb. 2011).
Wang, et al., "Fiber reorientation in hybrid helicoidal composites," Journal of Mechanical Behavior of Biomedical Materials, 110:103914, 1-11 (Jun. 2020).
Weaver, et al., "The Stomatopod Dactyl Club: A Formidable Damage-Tolerant Biological Hammer," Science, 336(3086):1275-1280 (Jun. 2012).
Weaver, et al., "Unifying Design Strategies in Demosponge and Hexactinellid Skeletal Systems," The Journal of Adhesion, 86:72-95 (Feb. 2010).
Wu, et al., "Discontinuous fibrous Bouligand architecture enabling formidable fracture resistance with crack orientation insensitivity," PNAS, 117(27):15465-15472 (Jul. 2020).
Yang et al., "AFM Identification of Beetle Exocuticle: Bouligand Structure and Nanofiber Anisotropic Elastic Properties," Adv. Funct. Mater., 27:1603993 1-8 (2017).
Yang, et al., "Crack-driving force and toughening mechanism in crustacean-inspired helicoidal structures," International Journal of Solids and Structures, 208(209):107-118 (2021).
Yang et al., "Global sensitivity analysis of low-velocity impact response of bio-inspired helicoidal laminates," International Journal of Mechanical Science, 187:106110, 1-11 (Sep. 2020).
Yang et al., "Impact and blast performance enhancement in bio-inspired helicoidal structures: A numerical study," Journal of the Mechanics and Physics of Solids, 142:104025, 1-17 (May 2020).
Yang, et al., "The role of ply angle in interlaminar delamination properties of CFRP laminates," Mechanics of Materials, 1-32 (May 2021).
Yaraghi, et al., "A Sinusoidally Architected Helicoidal Biocomposite," Adv. Mater., 28:6835-6844 (2016).
Yaraghi, et al., "The Stomatopod Telson: Convergent Evolution in the Development of a Biological Shield," Adv. Funct. Mater., 29:1902238, 1-13 (2019).
Yin, et al., "Tough Nature-Inspired helicoidal Composites with Printing-Induced Voids," Cell Reports Physical Science, 100109:1-18 (Jul. 2020).
Yin, et al., "Toughening mechanism of coelacanth-fish-inspired double-helicoid composites," Composites science and Technology, 205:108650, 1-8 (Jan. 2021).
Zaheri, et al., "Revealing the Mechanics of Helicoidal Composites through Additive Manufacturing and Beetle Development Stage Analysis," Adv. Funct. Mater., 28:1803073, 1-11 (May 2018).
Zhang, et al., "Ballistic impact response of Ultra-High-Molecular-Weight Polyethylene (UHMWPE)," Composite Structures, 133:191-201 (Jul. 2015).
Zhang, et al., "Effects of Curvature and Architecture on Ballistic Performance of UHMWPE Helmets," Proceedings of the ASME 2019 International Mechanical Engineering Congress and Exposition IMECE2019, IMECE2019-11566, 1-9 (Nov. 2019).
Zhang et al., "Uncovering three—dimensional gradients in fibrillar orientation in an impact-resistant biological armour," Scientific Reports, 6:26249, 1-13 (Apr. 2016).
Zorzetto, et al., "Wood-Inspired 3D-Printed Helical Composites with Tunable and Enhanced Mechanical Performance," Adv. Funct. Mater., 29-1805888, 1-9 (2019).
Zympeloudis, et al., "CMTS (Continuous Multi-Tow Shearing) for High-Volume Production of Complex Composite Parts," University of Bristol, Engineering and Physical Science Research Council, [slides, online], [retrieved Feb. 5, 2021], retrieved from Internet http://www.bristol.ac.uk/media-library/sites/composites/documents/cdt/conference/2016/evangelos-zympeloudis.pdf, 10 Pages, (Jun. 2016).
International Search Report & Written Opinion dated Sep. 8, 2023 in Int'l PCT Patent Appl. Serial No. PCT/US2023/025332 (0510).

\* cited by examiner

UNI-DIRECTIONAL

NON-CRIMPED MULTI-AXIAL

HIGH IMPACT-RESISTANT, REINFORCED FIBER FOR LEADING EDGE PROTECTION OF AERODYNAMIC STRUCTURES

CROSS-REFERENCE TO RELATED APPLICATION

This application claims the benefit of priority of U.S. Provisional Patent Appl. No. 63/367,085, filed Jun. 27, 2022, the entire contents of which are incorporated herein by reference.

FIELD OF USE

The present disclosure is directed to materials having a helicoidal architecture for protecting an aerodynamic profile.

BACKGROUND

Aerodynamic profiles are highly engineered to provide excellent aerodynamic efficiency. This can only be guaranteed if the shape of the aerodynamic profile does not change over time and if the surface of the profile is maintained as originally manufactured to avoid changes in the air flow around the profile. To this end, erosion of the leading edge (LE) of the aerodynamic profile due to high frequency impacts, and resulting damage of liquid-born and solid-born particles, such as rain, oil, water, sand, salt, and dust can cause critical losses in aerodynamic efficiency. For aerostructures including drones, commercial, military vehicles, and helicopter rotor blades, this can lead to increased drag with consequent increase in fuel consumption. The change in aerodynamic characteristic of the profile can also introduce a change in the load distribution, which in turn could result in vibrations and, in some cases, also lead to severe structural damage. For rotor blades this can lead to a decrease in power generation for a wide range of applications including wind energy production, jet engine efficiency, power production in submarine propellers as well as stationary gas and water turbines. Similar issues affect aerodynamic profiles of marine applications, including but not limited to fins, master poles, and submarine profiles.

In commercial as well as military aviation, erosion of the aerodynamic surfaces and of the surfaces exposed to the forward-facing flow are heavily subjected to erosion both from liquid and solid borne particles. These include, but are not limited to rain, sand, salt, dust, ash, hail, and ice. The forward facing regions of the aircraft more subjected to erosion and include, but are not limited, to the nose cone, the leading edge (LE) of wing, air intake of the engine, pylon, nacelle, vertical and horizontal stabilizers, and the rotating blades comprising the fan, compressor and turbine blades of an aircraft engine, as well as propeller blades.

In marine applications, erosion caused by liquid and/or solid-born particles can occur on the hydrodynamic and aerodynamic surfaces of the boat/vessel. These include, but are not limited to, salt, dust, sand, rock debris. Areas such as the forward facing surfaces of a vessel or boat can be damaged by erosion including, but not limited to, propeller blades, mast, wings, rudder, keel, hull, etc.

The blades of the wind turbine's rotor are the key components to capture the wind energy and to transform it into electricity. To maximize the annual electricity production (AEP) of a wind turbine, two parameters are important to consider: 1) location where the wind speed will be high and consistent, and 2) capacity and efficiency of the wind turbine design. For these reasons, operators and wind turbine manufacturers have been developing higher capacity turbines with longer rotor blades which results in higher blade speeds, and choosing locations such as offshore regions that demonstrate higher wind environments. As a result, blades are exposed to more extreme conditions and are subjected to more extreme durability challenges during their lifetime: impacts, erosion, delamination, UV exposure, thermal fluctuations, lightning strikes, ice, hailstones, etc. AEP is often significantly impacted by these problems, initially with a reduced aerodynamic efficiency as erosion of the leading edge of the blade begins to occur, followed by maintenance requirements and ultimately, if not repaired, full replacement of the blades or terminated operation of the wind turbine. Recent studies have estimated that blade roughness caused by rain erosion can reduce aerodynamics and ultimately reduce electricity production by 3% to 30% of a wind turbine capacity depending on the severity of the erosion process. Companies still engage in costly inspection and maintenance plans to repair damaged blades during the entire lifetime of a wind turbine as maximizing efficiency of electrical production far out-weighs these costs.

With more knowledge and experience regarding blade dynamics, the industry has been able to increase the length of rotor blades resulting in tip speeds of up to 130-160 meters per second. At these high speeds, critical areas of the blade require improved performance due to extreme deteriorating effects: rain erosion at the leading edge of the blade, impacts with objects on the pressure side (hailstones, birds, bugs, rain, hail, salt, etc.) and high stresses on the blade's structure. Specifically, during operation, blades will be damaged at different levels of severity, from a surface level which will impact efficiency, to the structural level that can lead to complete failure and premature end of life.

Therefore, blades require expensive maintenance and repair to ensure the maximum performance and energy output during service operation with additional down-time costs. Thus, monitoring and maintaining the blades to maximize electrical production and ensure a mechanically robust structure is constantly monitored for a cost-benefit analysis. The wind turbine industry has been focused on improving the overall durability of the blade. The area which commands the most focus and attention is the Leading Edge Protection (LEP).

Current LEP products, including solutions for wind rotor blades and aerostructures have proved unsatisfactory due to challenging applications and disappointing longevity results, including those affected by impact damage caused by rain, sand, dust, hashes, oil, salt, hail, and bird strikes. Rather than relying on an ineffective LEP, most OEMs have adopted a practice of either over-building the minimum wall gauge to improve impact resistance, or to apply metallic shields (especially in aerospace related applications). Both solutions increase the cost of the blades, make the blades heavier, create challenges in delivering a good bonding between dissimilar materials, and create challenges of matching differing materials to have similar flexural characteristics required during operation. Subsequently, for rotating propellers and blades, the added weight to the blades requires more energy to rotate, which also reduces their overall energy efficiency and power production. Further, for fixed aerodynamic surfaces, such as the leading edge of an aircraft wing, the overall weight of the structure is increased leading to overall higher manufacturing costs and increased fuel consumption during operation.

Most common proposed solutions to increase robustness of the leading edge against erosion rely on the use of metallic shields for aerospace related applications and on the use of polymer-based coatings and paintings such as 3M Wind Blade Protection Coating W4600 and W4601, ReNEW W-Series, HC05XP1 (made available by Hontek, South Windsor, Connecticut), or a RELEST Wind coat (made available by BASF, Ludwigshafen, Germany) for wind energy generation as well as helicopter blade solutions. The thicker the coating, the longer the protection against rain erosion. However, to build up thickness during manufacturing requires several coatings with drying time between. This results in: 1) labor cost increases; 2) weak interfaces are introduced between the layers of coatings leading to loss of protection; 3) the coating often peels off creating flying parts that decreases aerodynamic efficiency as well as increase noise; 4) while the use of such coatings helps with resisting erosion, they are unable to function as a protection against more severe impact damage from hail stones, birds or lightning strikes; and 5) since these coatings are applied manually using brushes or spray techniques, these often lead to variable thickness coated layers with consequent loss of geometrical stability and aerodynamic performance. The last aspect could be obviated with using a protective tape. However, this option presents the same limitations of 1-4 as indicated above.

Other proposed solutions such as those described in WO 2008/157013 and WO 2013/092211 make use of shield and covers manufactured ahead of being placed on the finished blade. The main disadvantages of such solutions are the following: 1) it is difficult to guarantee the correct geometrical stability of such thin and slender protective covers; 2) it is difficult to handle the small and thin covers during assembly, with the blade shield being very flexible due to the long dimension; 3) they require an additional manufacturing step which requires an additional mold to shape the shell to the complex LE profile; and 4) the increased number of parts increases the manufacturing complexity, cost, and risk of defects due to imperfect integration.

In addition, WO 2017/198167 describes a proposed solution using a co-curing process where the LEP devised is co-built with the rest of the profile. The proposed solution makes use of one or more layers of short fiber mats or woven fabrics which are impregnated with paint or coating material, while the fiber reinforcement is used to build up thickness and avoid inconsistencies during coating which leads to a more uniform protection. This thicker fabric also assists to reduce crack propagation and protects against more severe damage such as those from hail stone impacts.

Notably, the liquid and solid-born erosion phenomenon has often been treated as a surface problem, but not as a low-energy, high repetition impact problem. The high tip speed reached by the blade (up to 160 m/s) leads to a phenomenon of impact fatigue, with high frequency, low mass (0.015 g), low energy (~0.12 J) impacts repeated on the blade surface. In the case of liquid droplets, the impact of the droplet generates strong water hammer pressure with peaks of ~134 MPa, which is close, if not higher than, the strength of standard polymer resins used in FRPs which compose the skin of the blade (commonly made with Glass fiber NCF embedded in a thermoset resin for wind rotor blade applications).

A better performing solution is to quickly dissipate energy in-plane, rather than through the thickness, to avoid damage localization, and finally have a high dampening coefficient to further dissipate the energy carried by such stress waves. The stress wave propagation can be controlled via changing the impedance of the material being impacted (i.e., LEP) via either changing the constituents composing the material or by changing the architecture of how such constituents are arranged (i.e., the microstructure). In such a scenario of a stress wave dominated problem, reinforcement such as short fiber and woven composites (relevant to WO 2017/198167) are not the optimal choice. The crimp in the woven material as well as the fiber ends in the short fiber composites represent sites of stress concentrations as well as areas subjected to the reflection of the stress waves. This, in turn, results in increased damage formation in the substrate subjected to both rain impact and larger mass impact. Furthermore, the woven and short fiber constructions lead to the formation of several resin reach areas. These act as a site for crack nucleation due to the change in impedance between a fiber reach area and a resin reach area.

An additional issue related to current LEP solutions is the requirement to use higher-performing materials which unfortunately have a negative environmental footprint, such as glass fiber or high strength metallic shields. In fact, no solution is available that makes use of bio-based products both the in terms of polymers as well as reinforcements.

In view of the foregoing drawbacks of previously known systems and methods, there exists a need for a technology that enables the use of such materials in applications where aerodynamic profiles are subjected to water/sand/dust erosion such as wind blade, aerodynamic surfaces of aerostructures, and rotor blade applications as it would allow for acceptable performance while offering an improved environmental footprint. Sustainable materials such as natural-fiber composites have an estimated 50% lower carbon footprint compared to glass-fiber composites, showing greenhouse gas emission savings of up to 70% compared to their functionally equal fossil-based counterparts.

It would further be desirable to provide a LEP solution capable of tailoring stress wave propagation speed of the aerodynamic structure and that also provides load carrying strength for the aerodynamic structure.

SUMMARY

The present disclosure overcomes the drawbacks of previously-known systems and methods by providing a LEP solution that leads to a better rain/sand/dust/water erosion protection exploiting the use of long fiber helicoidal laminates with graded material properties.

For example, an apparatus for protecting an aerodynamic profile having a length and a leading edge is provided. The apparatus may include a plurality of plies of parallel reinforcing fibers that extends along at least a portion of the length of the aerodynamic profile and over at least the leading edge of the aerodynamic profile, and a resin matrix including a resin permeated between the reinforcing fibers of each ply of the plurality of plies and between adjacent plies of the plurality of plies. Moreover, at least a portion of the plurality of plies may be helicoidally arranged relative to one another to tailor stress wave propagation speed and acoustic impedance of the aerodynamic profile and to provide load carrying strength for the aerodynamic profile and dampen high frequency impacts generated by impact on the aerodynamic profile. For example, the impact may be at least one of rain droplets, hail, dust, ice, sand, or salt.

The aerodynamic profile may be a wind turbine blade, a fixed leading edge of an aircraft, an open rotor blade, a helicopter blade, a nose cone, an air intake of an engine, a pylon, a nacelle, vertical and horizontal stabilizers, a propeller blade, a fan blade, a mast, a keel, a rudder, a wing, or forward facing areas of a boat hull. The parallel reinforcing fibers may include unidirectional long fiber composites and/or a non-crimp fabric (NCF). For example, the non-crimp fabric may include a biaxial configuration and/or a quadriaxial configuration, and further may include at least one of e-glass or natural fiber materials. For example, the natural fiber materials may include at least one of flax, sisal, hemp, kenaf, or bamboo. In addition, the parallel reinforcing fibers may include at least one of carbon, glass, aramid, ultra-high-molecular-weight polyethylene (UHMWPE), polypropylene (PP), or a natural fiber.

The resin may include at least one of a thermoset or a thermoplastic resin. Moreover, a difference in elastic modulus between the resin and the parallel reinforcing fibers may be at least a factor of ten. At least a portion of the plurality of plies may be helicoidally arranged relative to one another in a non-symmetric manner and/or in an unbalanced manner. At least a portion of the plurality of plies extending over the leading edge of the aerodynamic profile may include a pitch angle between 20 and 30 degrees. In addition, at least one of a resin system, fiber reinforcement, or fiber treatment of the apparatus may be selected to tailor the hardness of the aerodynamic profile to thereby tailor stress wave propagation speed and acoustic impedance of the aerodynamic profile.

Moreover, the plurality of plies may include a first plurality of plies of parallel reinforcing fibers that are not arranged in a helicoidal relationship to provide load carrying strength for the aerodynamic profile, such that an included angle between orientation directions of a first pair of adjacent plies of the first plurality of plies may be 30° or more. Additionally, an included angle between orientation directions of at least one other pair of adjacent plies of the first plurality of plies may be 30° or more. The plurality of plies further may include a second plurality of plies of parallel reinforcing fibers that are arranged in a helicoidal relationship, such that an included angle between orientation directions of at least two adjacent plies may be more than 0° and less than about 30° to provide impact resistance for the reinforced composite structure, e.g., the aerodynamic profile. The apparatus further may include a top coating coupled to the plurality of plies.

DETAILED DESCRIPTION

Figure 1A:
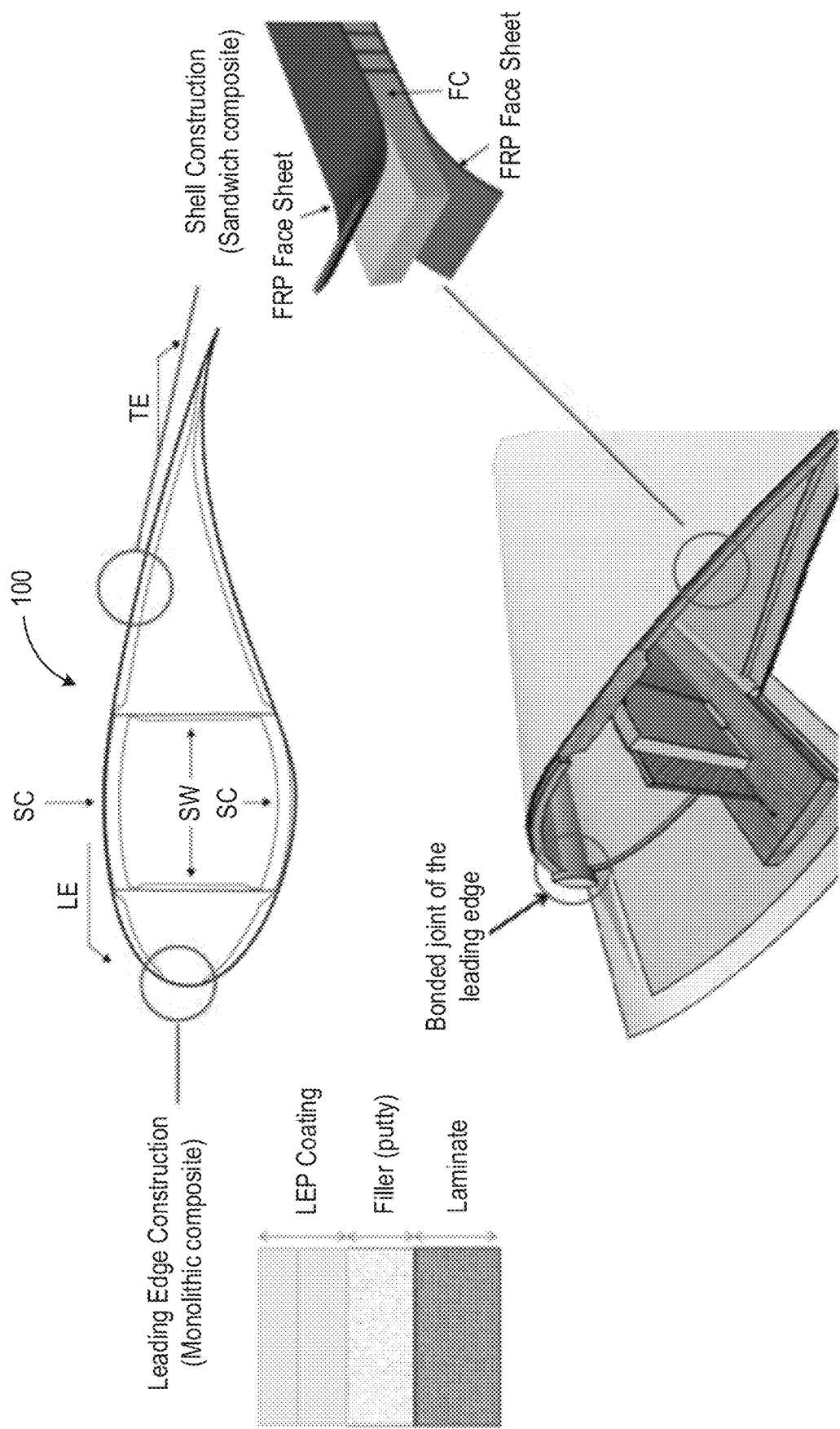
FIG. 1A illustrates various views of leading edge architectures of a wind energy blade.

The present disclosure overcomes the drawbacks of previously-known systems and methods by providing a LEP solution for a generic aerodynamic profile that leads to a better erosion and impact protection exploiting the use of long fiber helicoidal laminates with graded material properties. FIG. 1A illustrates the LE architectures adopted in wind energy blades, e.g., a wind turbine blade. As shown in the FIG. 1A, wind turbine blade 100 may include leading edge (LE), trailing edge (TE), spar cap (SC), and shear webs (SW). The construction of leading edge (LE) may include a monolithic composite. For example, the leading edge construction may include 500-1000 μm filler (putty), sandwiched between 2-3 layers of 500-1000 μm LEP coating and 2 biaxial layers of 0.8-1.6 mm fiberglass (epoxy). Moreover, leading edge (LE) of wind turbine blade 100 may include a bonded joint. In addition, the shell construction of wind turbine blade 100 may include a sandwich composite formed by foam core (FC) sandwiched between adjacent layers of FRP face sheet.

Figure 1B:
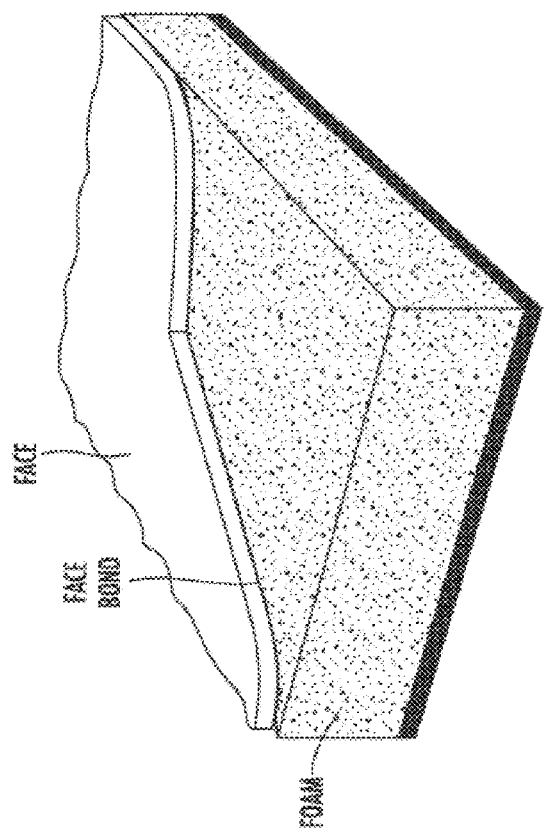
FIG. 1B illustrates a composite sandwich structure.

For example, placing a material including, e.g., a polymer layer on foam material between composite laminate face sheets, as shown in FIG. 1B, creates a synergistic structural configuration in which the face sheets provide bending stiffness and the sandwich material provides shear rigidity and buckling resistance. Compared to monolithic laminate composites, sandwich panels may exhibit improved strength-to-weight ratios, sound deadening, fatigue capability, thermal insulation, and impact/damage resistance. Sandwich panel impact performance may be superior to laminates since some of the energy associated with a strike may dissipate as elastic deformation instead of matrix and/or fiber damage and/or the core may cushion inertial loads while the face sheet performs the energy absorption. However, while the laminate composite may deform, the coatings often used in these applications do not have the same flexural characteristics which may result in the coating cracking which will materially reduce their performance and result in premature end of life. Laminate face sheet configuration, core type/structural properties, and boundary conditions control the impact behavior. Typically, in sandwich designs the face sheets are relatively thin and the core is bonded to the face sheets with an adhesive. Structural and failure mechanisms that make sandwich inappropriate for some applications include the following: a) because of limited bond area and strength the face sheets may prematurely separate from the core during impact; b) since the face sheets are thin relative to an equivalent laminate design fiber breakage, fiber matrix de-bonding and laminate delamination can initiate at lower impact levels; c) the core can crush or experience shear deformation; and d) replacing laminate plies with sandwich material can degrade in-plane structural properties like compression, tension, strength and stiffness.

Figure 1C:
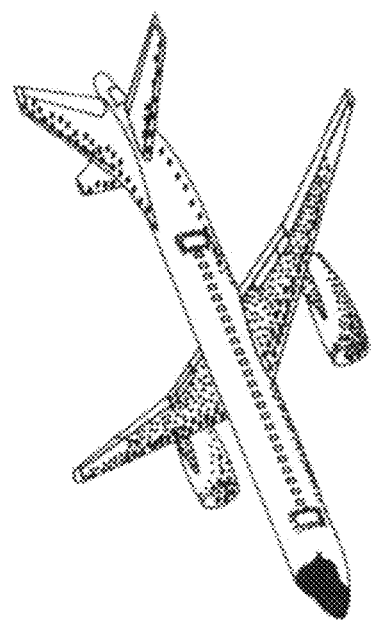
FIG. 1C illustrates a schematic of areas on an aircraft exposed to liquid and/or solid particles impingement that could lead to erosion of an aerodynamic surface.
Figure 1D:
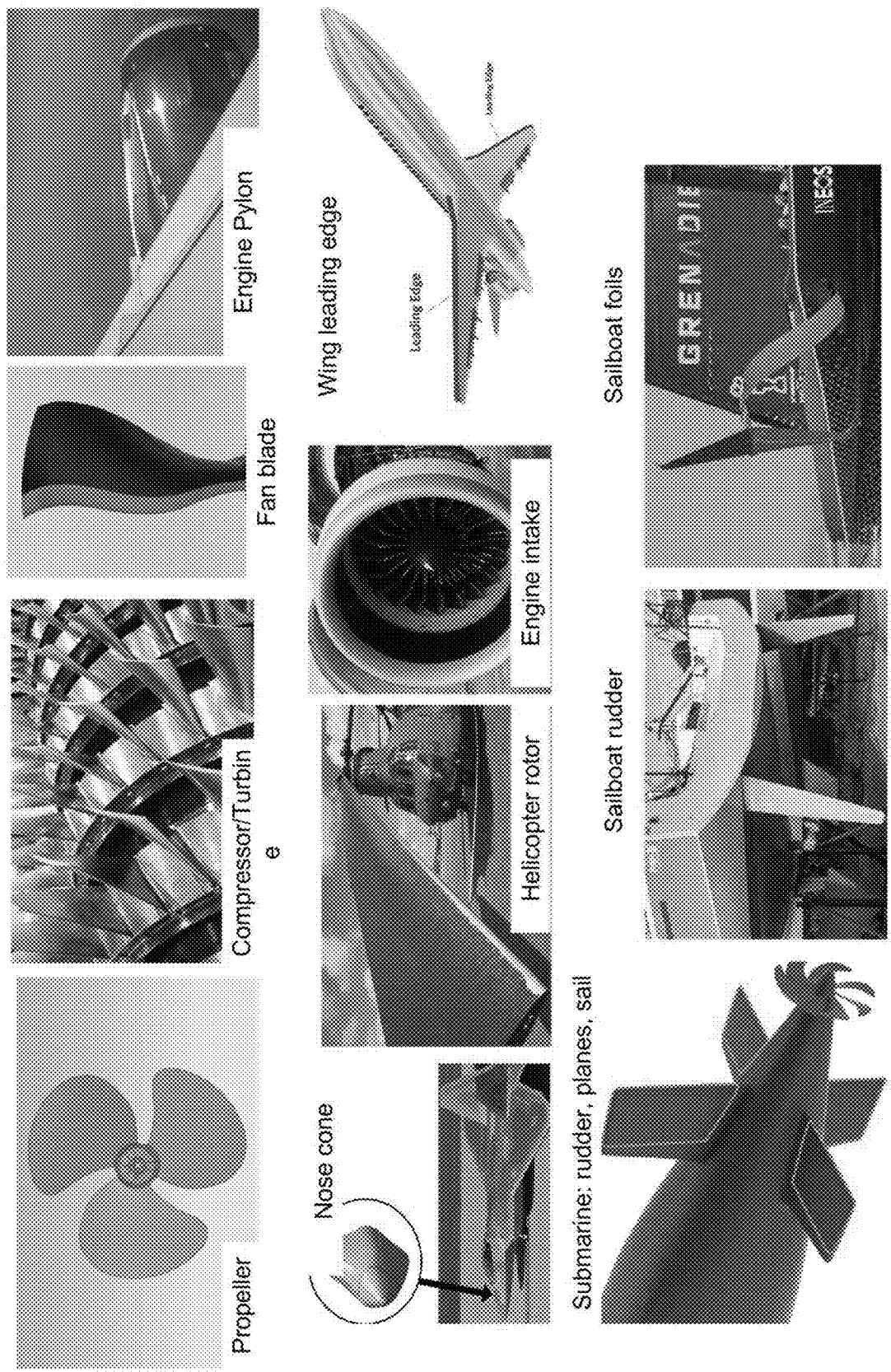
FIG. 1D illustrates various blades and aerodynamic profiles that may benefit from the reduction of the effect of liquid-born or solid-born erosion in accordance with the principles of the present disclosure.

FIG. 1C illustrates areas of an aircraft structure that may be improved with the invention disclosed herein. FIG. 1D illustrates other types of blades and aerodynamic profiles constructions found in other industrial applications that would benefit from the disclosed invention as to reduce the effect of liquid-born or solid-born erosion. These include, but are not limited to, propeller blade, wing leading edge, air engine intake, engine nacelle, nose cone, helicopter blades, compressor/turbine blades, and open rotor propellers for aero and marine applications.

The solutions described herein are based on the use of long (>2 mm) fiber reinforced composites having a helicoidal architecture, such as those described in U.S. 2021/0316528 and U.S. 2021/0339499, both assigned to assignee of the instant application, the entire contents of each of which are incorporated herein by reference, with material aligned with a graded hardness and stiffness to develop an efficient and highly tailorable LEP solution with longer durability than conventional solutions while yielding lighter, and optionally, more environmentally sustainable solutions.

Figure 2B:
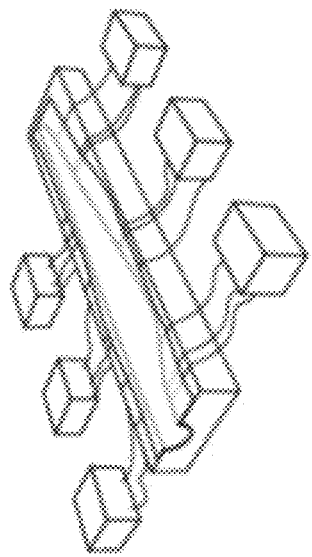
FIG. 2 illustrates an exemplary blade manufacturing process.
Figure 2D:
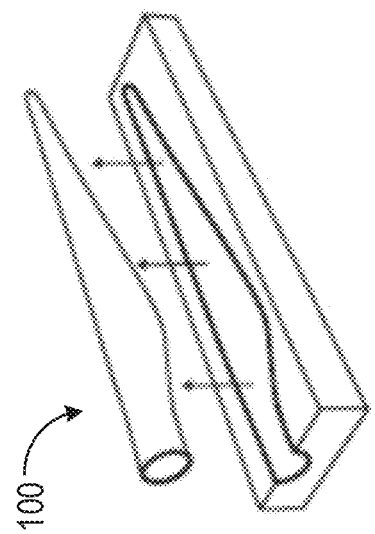
Figure 2A:
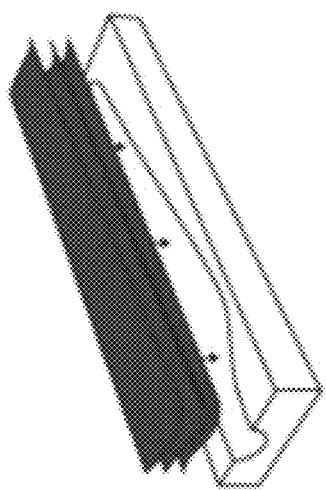
Figure 2C:
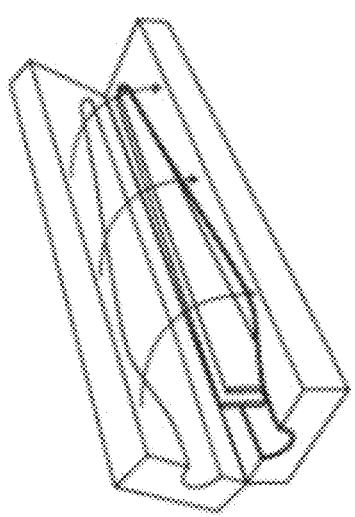

Referring now to FIGS. 2A to 2D, an example of the blade manufacturing process is described for wind rotor blades. The long fiber reinforced composites having a helicoidal architecture may be applied to the wind turbine blade during material preparation of the fiber, core, etc. of the wind turbine blade, as shown in FIG. 2A. The use of such high-impact resistant fiber reinforcement LEP holds the potential to reduce the amount of coating needed to protect against rain erosion, protect against more catastrophic events such as bird or lightning strikes, and further reduce the structural weight of the blade and which can also lead to longer blades with higher energy production. As described in further detail below, resin infusion may be conducted on the suction side and the pressure side of the wind turbine blade, as shown in FIG. 2B. Moreover, each shell and the shear webs of the wind turbine blade may be assembled, e.g., via adhesive, as shown in FIG. 2C, and the wind turbine blade may be demolded, trimmed, and polished, as shown in FIG. 2D.

Figure 4:
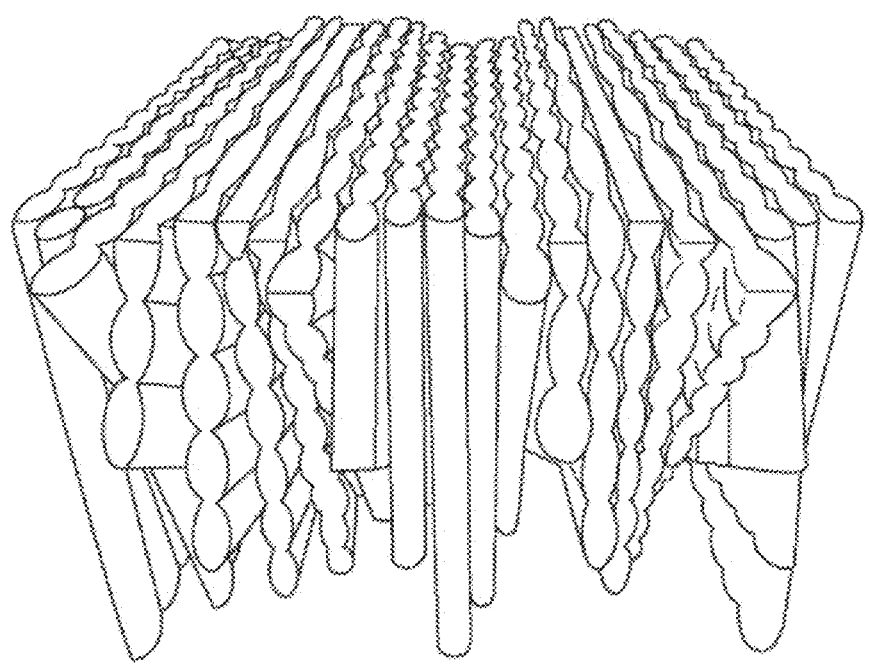
FIG. 4 illustrates a stack of fiber layers arranged into a helicoidal pattern in accordance with the principles of the present disclosure.
Figure 3:
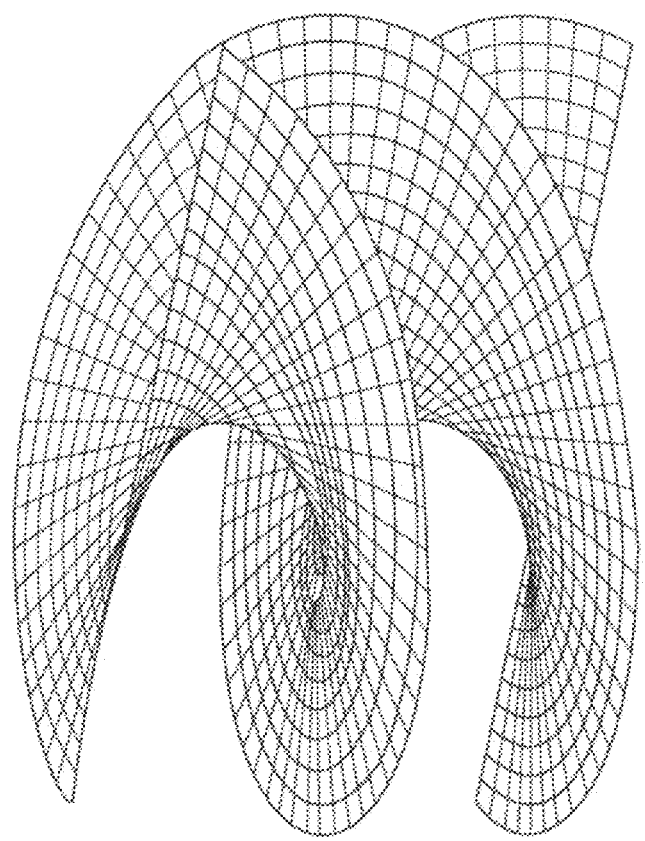
FIG. 3 illustrates an example of a helicoidal geometry.
Figure 5A:
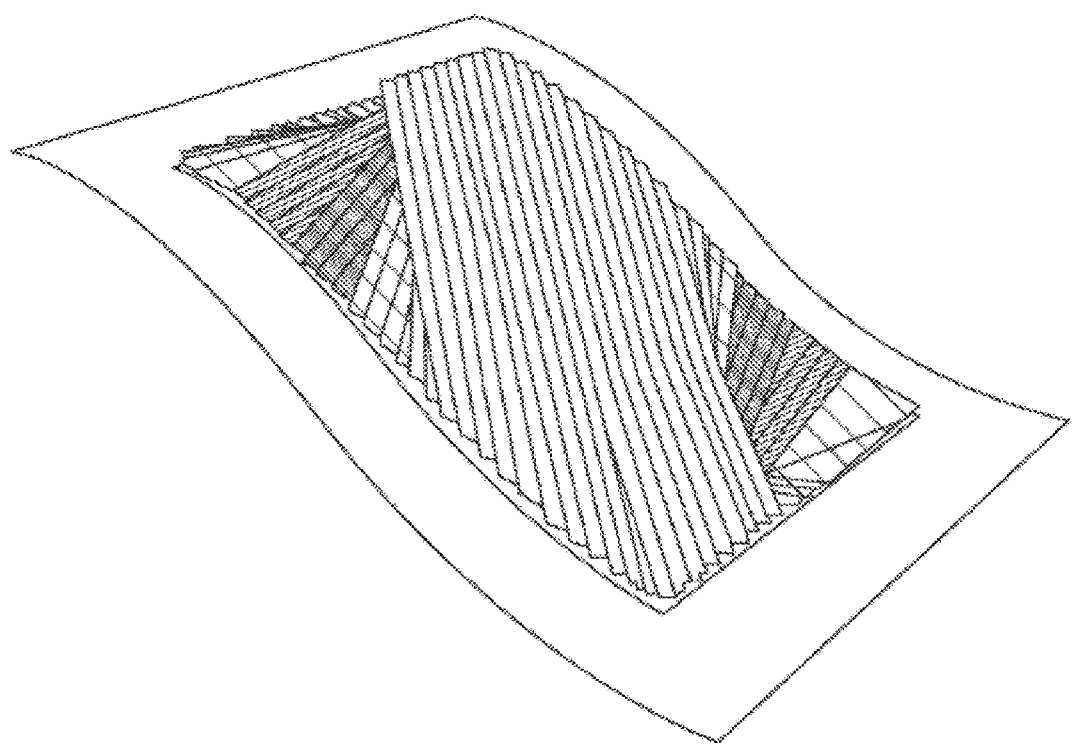
FIG. 5A illustrates a helicoidal preform made of straight fiber placement on a 3D curved shape in accordance with the principles of the present disclosure.
Figure 5B:
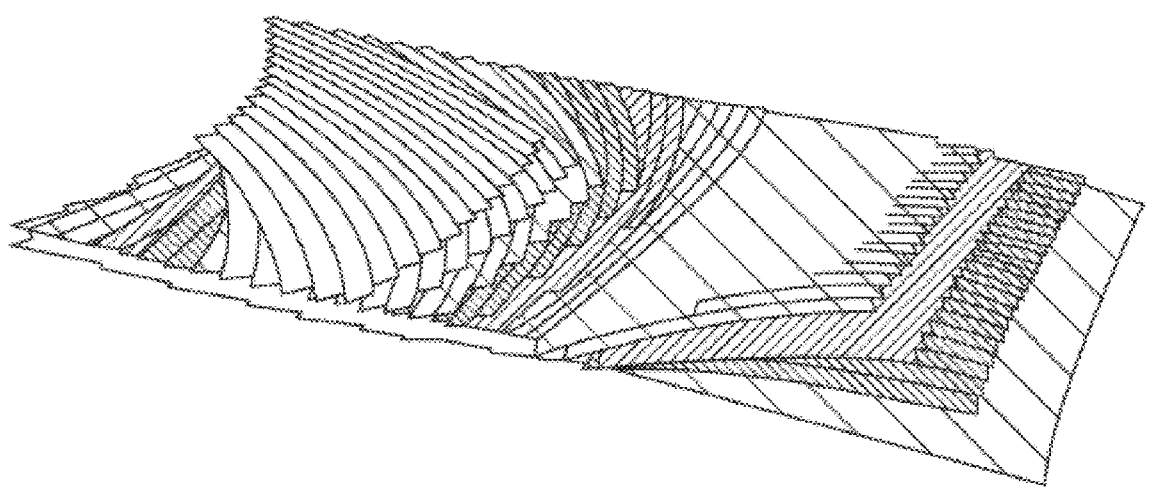
FIG. 5B illustrates a helicoidal preform made of curved fiber placement on a 2D shape in accordance with the principles of the present disclosure.

Contrary to past proposed solutions, which has made use of woven long fiber composites, the present disclosure uses graded long fiber composites having a helicoidal architecture, such as the helicoidal geometry shown in FIG. 3. As used herein, the term "helicoidal" refers to a stacking arrangement of plies of fibers, as shown in FIG. 4, wherein the fibers of at least one ply define an orientation direction relative to an orientation direction of the fibers of an adjacent ply and that provide an included angle greater than 0 degrees and less than about 30 degrees. The stacking arrangement may include adjacent plies that define included angles outside of this range, and the stacking arrangement may have less than a full rotation of 360 degrees, or may have more than one full rotation. The fiber orientation direction of one or more plies may be straight or curved. For example, FIG. 5A illustrates a helicoidal preform made of straight fiber placement on a 3D curved shape, and FIG. 5B illustrates a helicoidal preform made of curved fiber placement on a 2D shape.

Figure 6:
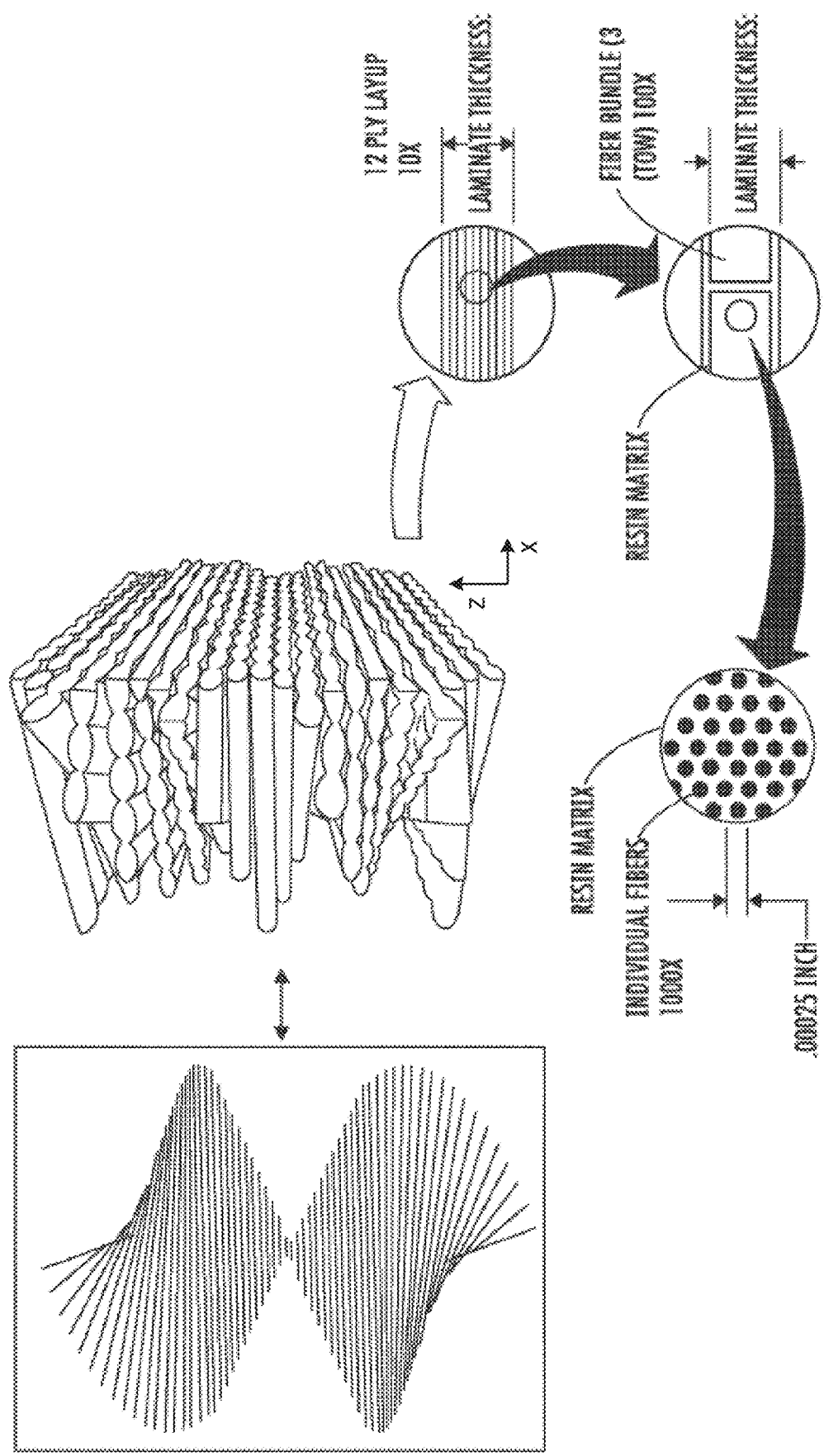
FIG. 6 illustrates a helicoidal laminate stack.

For example, FIG. 6 illustrates a fiber reinforced elastic composite ply stacking approach in which the individual layers are rotated along the longitudinal or x-direction axis at a predefined angle relative to the adjacent layers so as to create a z-direction helicoidal fiber-oriented stack. The left-hand image uses a single line to represent each ply layer (lamina), this view highlights the generated z direction helicoidal spiral. The right-hand image uses fiber bundles (tows typically consisting of 3,000 to 50,000 fibers or more) to more realistically show the construction layers of a helicoidal layup. The subsequent blow ups show how the helicoidal laminate stack is formed of individual laminae layers that are formed of fiber tow and resin. Helicoidal clocking may be chosen to create a specific spiraling pitch or circular polarization z orientation fibers that are in close enough proximity as to exhibit significant interlaminar-like direct load sharing between laminate fibers.

The ability of the fibers to load share directly between laminae plies is a significant contributor to a helicoidal laminate's ability to absorb and dissipate impact forces more efficiently than conventional composite layups and minimize the effects of impact fatigue. Further, the spiral formed from the assembly of these pitched fibers may be tuned to a specific wavelength to dampen propagating shock waves initiated by impact forces on the aerodynamic profile, and further may be filled with a matrix that contains microspheres or toughening particles to further prevent or arrest propagation of catastrophic fractures and may be made to exploit the difference in elastic moduli between the fibers and resin to further arrest fractures generated from blunt or sharp impacts.

Figure 7A:
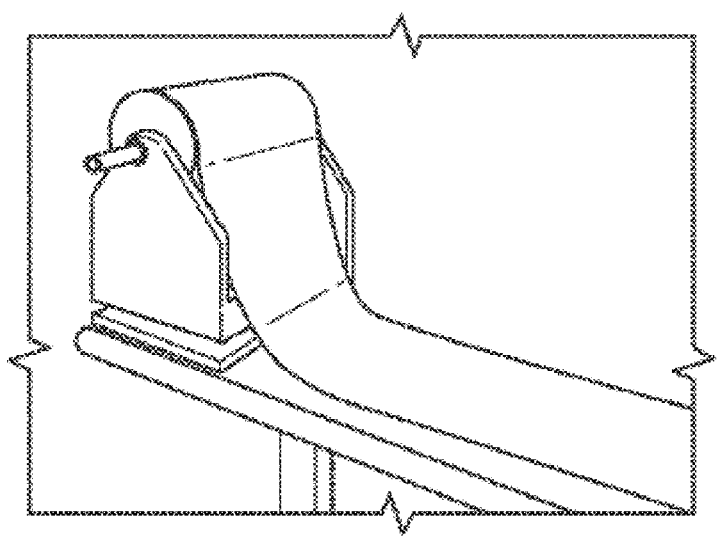
FIG. 7A illustrates uni-directional material form.
Figure 7B:
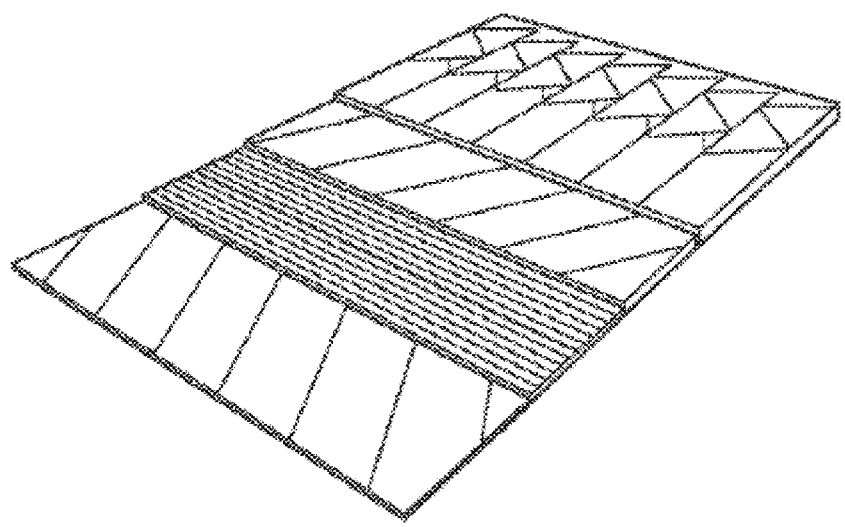
FIG. 7B illustrates non-crimped multi-axial material form.

Moreover, the graded long fiber composites may be in the form of uni-directional (UD) and/or Non-Crimp Fabrics (NCF), which will allow for: 1) the fibers to remain straight and avoid areas where the stress waves generated during the erosion process could be arrested and reflected generating damage (such as in the crimp region of woven fabrics or at the end of short fibers); 2) a more uniform in-plane stress wave dispersion to allow for a quick dispersion of stress waves; and 3) a tailored through-the-thickness stress wave dispersion for optimal dampening in the 3D space. For example, FIG. 7A illustrates UD manufacturing, and FIG. 7B illustrates an example of non-crimped multi-axial fabric. Overall, the combined action of these features will allow the material to: 1) relax quickly before subsequent impact events; 2) better dampen the high frequency impacts generated by repeated water droplets, sand, or salt; and 3) better diffuse energy in-plane, which results in less localized damage.

Figure 8:
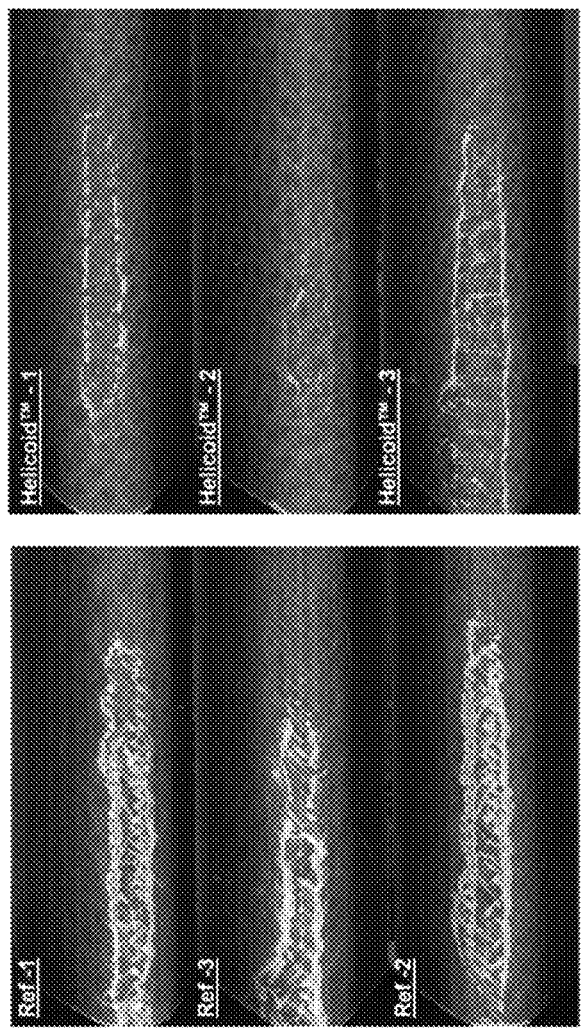
FIG. 8 illustrates results of rain erosion tests (ASTM G76) performed on two aerodynamic profiles representative of a leading edge in a wind rotor blades.

The fiber architecture of the layup shall contain, at least partially, a helicoidal layup. In the context of wind rotor blades, the use of ASTM G76 tests have demonstrated, as shown in FIG. 8, that the helicoidal layup described herein compared to conventional layups used in wind blade applications is capable of greatly reducing the eroded mass by about 34%. This is achieved due to the ability of the helicoidal fiber arrangement to better dampen stress waves, dissipating them away from the impact location, as well as spreading damage in plane by forming sub-critical matrix damage that allows for the impact energy to be dissipated while preserving structural integrity. FIG. 8 illustrates one profile utilizing NCF fibers in a conventional architecture used in-field applications and an aerodynamic profile characterized by NCF fibers helicoidally arranged.

Figure 9:
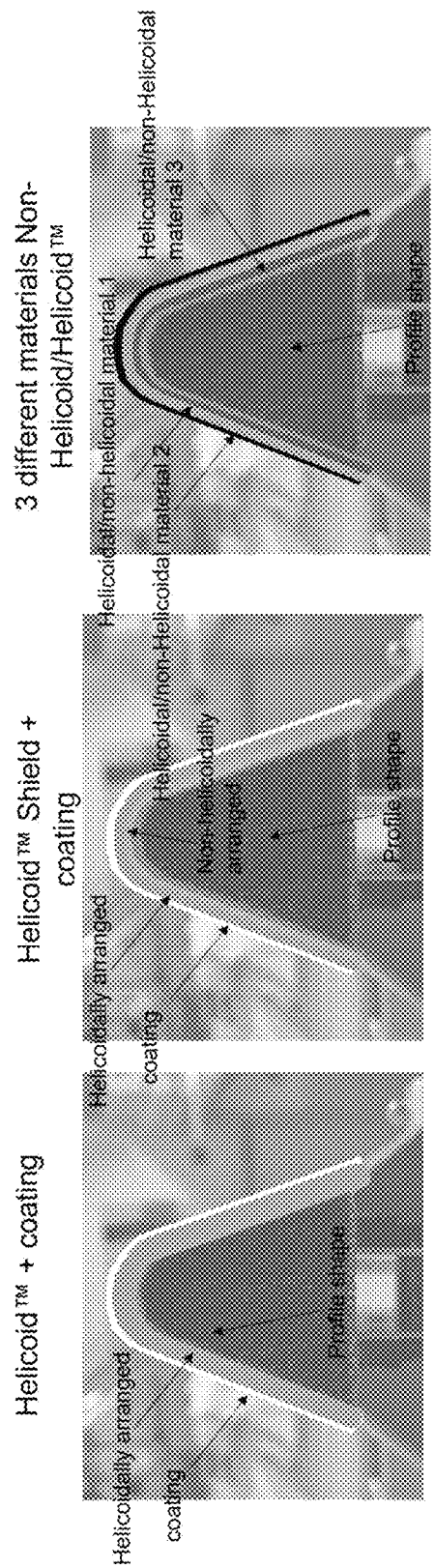
FIG. 9 illustrates a schematic of possible construction of the leading edge protection with a fiber reinforced construction at least partially helicoidally arranged in accordance with the principles of the present disclosure.

FIG. 9 illustrates a schematic of possible construction of the leading edge protection with a fiber reinforced construction at least partially helicoidally arranged, potentially, in combination with other material components to tailor the stress wave propagation characteristic of the multi-material solution, aiming at improving erosion and impact resistance.

In some embodiments, the helicoidal layup may be non-symmetric and/or unbalanced. For example, as the region of the LEP has high curvature, and is limited to a small region of a much larger structure, the effect of stiffness coupling may not be relevant. Further, the pitch angle may be kept constant or be variable to provide tailored performances. This is to promote certain types of damage within the composite such as delamination between the helicoidal layers, which will further help to dissipate energy and reduce damage. For example, the use of a larger pitch angles (between 20° and 30°) at the side of the LEP closer to the blade surface will allow to arrest eventual cracks that originally form on the top or exterior surface of the blade.

As described above, the graded long fiber composites having a helicoidal architecture, e.g., a helicoidal stack, may be made using NCF. As long fiber NCF are the typical fabric used for the manufacturing of the wind blade skins as well as wing skins of aircrafts, this will make the manufacturing and handling of the LEP easier. NCF could be biaxial (BX) such as X°/−X° layers slightly rotated to create the helicoidal layup or by developing a multiaxial (MX) fabric with layup X°/X°+α/X°+2α/X°+3α/ . . . /X°+n*α where α represents the inter-ply angle between adjacent plies to form the helicoidal layup and n+1 represents the total number of plies composing the MX fabric. The inherent design of a MX already embeds a partial helicoid. With this it would be possible to create the LEP by using only a few layers of material during the layup with minimum waste and reducing labor costs and complexity of manufacturing.

Suitable fibers that may be used for the LEP may include, for example, carbon, glass, aramid, ultra-high-molecular-weight polyethylene (UHMWPE), polypropylene (PP), and various natural fibers. Moreover, suitable resin systems may include thermoset, thermoplastic, vitrimer and self-healing polymer resins formed with either synthetic or natural polymer precursors. In order to promote the activation of failure mechanisms including sub-critical damage formation and spiraling cracks, the difference in elastic modulus between resin and fiber should at least be a factor of ten. This will grant the activation of crack deflection mechanisms, paramount to diffuse damage helicoidally.

In some embodiments, the helicoidal stack may be made with NCF reinforcement made of E-Glass, which is a typical material used to make the blade skins in the wind rotor market, or of natural fiber materials, e.g. flax, sisal, hemp, kenaf, bamboo, etc., which are characterized by outstanding dampening properties. As glass fiber is higher performing and less subject to environmental effect, e.g. moisture absorption, it would be very challenging at equal or better performance to replace the blade completely with natural fibers. However, since the LEP covers only a small portion of the blade surface, this represents a cost-effective solution to introduce a more sustainable material within the wind blade market. Further, an LEP that is replaced during maintenance will generate less waste and have a higher grade of recyclable and bio-based materials, thereby decreasing the environmental footprint of the proposed solution.

In another embodiment, the helicoidal stack may be made using carbon fiber UD prepreg stack of NCF. This would be more relevant to aerostructures which make a more extensive use of carbon fiber materials.

The graded hardness of helicoidal LEP protection may be achieved by hybridizing the type of fiber used within the helicoidal layup. For example, the use of flax hybridized with glass fiber when in helicoidal form provides superior impact resistance versus that of a conventional glass-only solution. Moreover, a hybrid NCF helicoidal LEP using glass fiber/epoxy material at the most external layer of the LEP (only a few layers) may provide the appropriate hardness for quick stress wave propagation supported by a high damping material, such as flax-epoxy composite. In this way: 1) the graded hardness would allow for faster dissipation of stress waves at the impact point; and 2) part of the glass material, which has poor recyclability and is heavy, may be replaced with flax material, which is a better environmental solution and lighter material that also provides damping. All of the aforementioned layers would be at least partially arranged in a helicoidal layup, as described herein. In another embodiment, layers of different fiber types may be dispersed within the laminate thickness rather than blocked together in specific regions of the laminate.

The helicoidal reinforcement further may be built using materials with a progressively increasing hardness by changing the material constituents, not the fiber architecture/layup. This may allow for a quicker dispersion of stress waves as, for example, a rain droplet impacts the surface and hence would result in a delayed crack initiation at the surface. For example, such graded materials may be achieved using either: 1) different resin systems (e.g., wet layup procedure during placement of each layer of the LEP, before curing or post-curing treatment, or varied resin to catalyst mixtures, to increase hardness, or by adding an additional phase to the matrix); or 2) different fiber reinforcements and/or fiber treatment. Having harder fibers may help to increase the stress waves propagation speed depending on the new ratio of longitudinal and bulk moduli over the new density of the harder fiber. This may be beneficial to help the material relax during the high frequency impacts of, e.g., rain droplets. Another example of graded helicoidal material may be achieved by targeting a difference in density between the helicoidal layers. For example, this may be achieved by using NCF or UD fabrics with same fiber areal weight but different yarn sizes. For the same grams per square meter (gsm), using low fiber count yarns leads to a more uniform distribution of fibers, while a higher fiber count yarn leads to a more "inconsistent" fabric. Thus, for the same fiber areal weight of the fabric, the density distribution in each ply is more uniform in a 68 tex while with periodic changes in a 200 tex.

In some embodiments, the graded hardness helicoidal protection may be realized with a step change in hardness properties between the helicoidal composite substrate and a top coating. For example, this may be achieved by spreading a coating on the surface of the helicoidal composite substrate to generate two distinct regions characterized by uniform homogenized hardness.

Figure 10A:
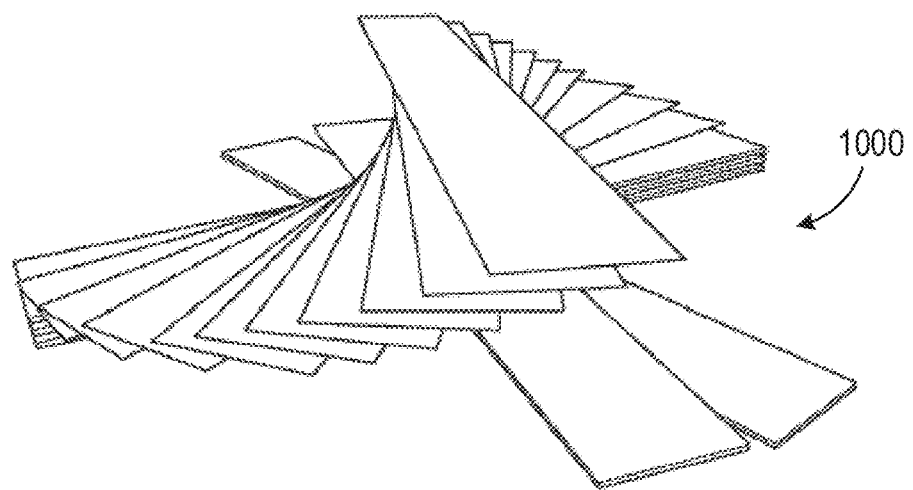
FIGS. 10A to 10C are schematic views of a structure that includes both impact resistance and load carrying strength.
Figure 10B:
Figure 10C:
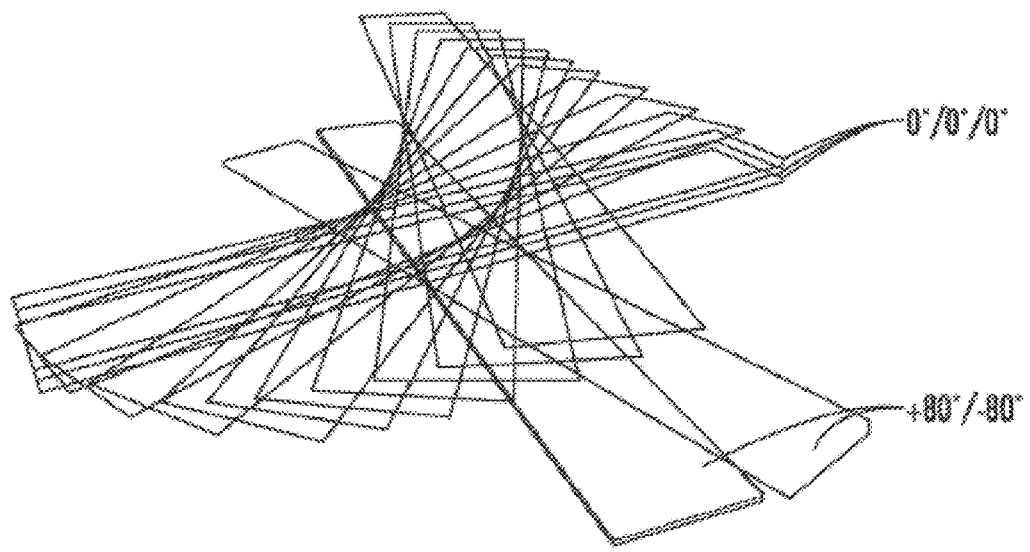

The helicoidal material described herein may be used to form the aerodynamic profile to prevent cracks from propagating along the underneath structure. For example, FIGS. 10A to 10C show schematic views of a ply arrangement for a fiber-reinforced composite structure 1000 according to embodiments of the present disclosure. FIG. 10B represents a cross section of the structure shown in perspective in FIGS. 10A and 10C. Composite structure 1000 may have first plurality of plies 1002 of reinforcing fibers defining a first region of the fiber reinforced composite structure, the plies having parallel fibers, and wherein the plies are arranged to provide load-carrying strength for the reinforced composite structure. In the example shown, first plurality of plies 1002 includes five plies. The two plies at the bottom are arranged at +80 degrees/−80 degrees, and the three plies above those are both arranged at 0 degrees. In this example, the 0 degrees plies are arranged along the axis of an axisymmetric part, such as a tubular structure, and provide strength in the direction of primary loading. The +80 degrees/−80 degrees plies serve to reinforce the 0 degrees plies and resist buckling of the axisymmetric part, such as might be advantageous in long, thin tubular structures.

Second plurality of plies of reinforcing fibers 1004 define a second region of the fiber reinforced composite structure and are arranged in a helicoidal relationship, wherein an included angle between the orientation directions of at least two adjacent plies is more than 0 degrees and less than about 30 degrees to provide impact resistance for the reinforced composite structure. In the illustrated example, the plies (starting from the top and working down) are arranged at 70 degrees, 65 degrees, 60 degrees, 55 degrees, 50 degrees, 45 degrees, 40 degrees, 30 degrees, 20 degrees, and 10 degrees. As described herein, this helicoidal relationship provides impact resistance to the underlying structure. Although shown with thin ply uni-directional (TPUD) plies for the second plurality of helicoidal plies and thick plies for the other plies, which provides advantages in terms of impact resistance, primary load carrying ability and reduced layup time, the thickness of the plies may be the same for each of the plies.

Figure 11:
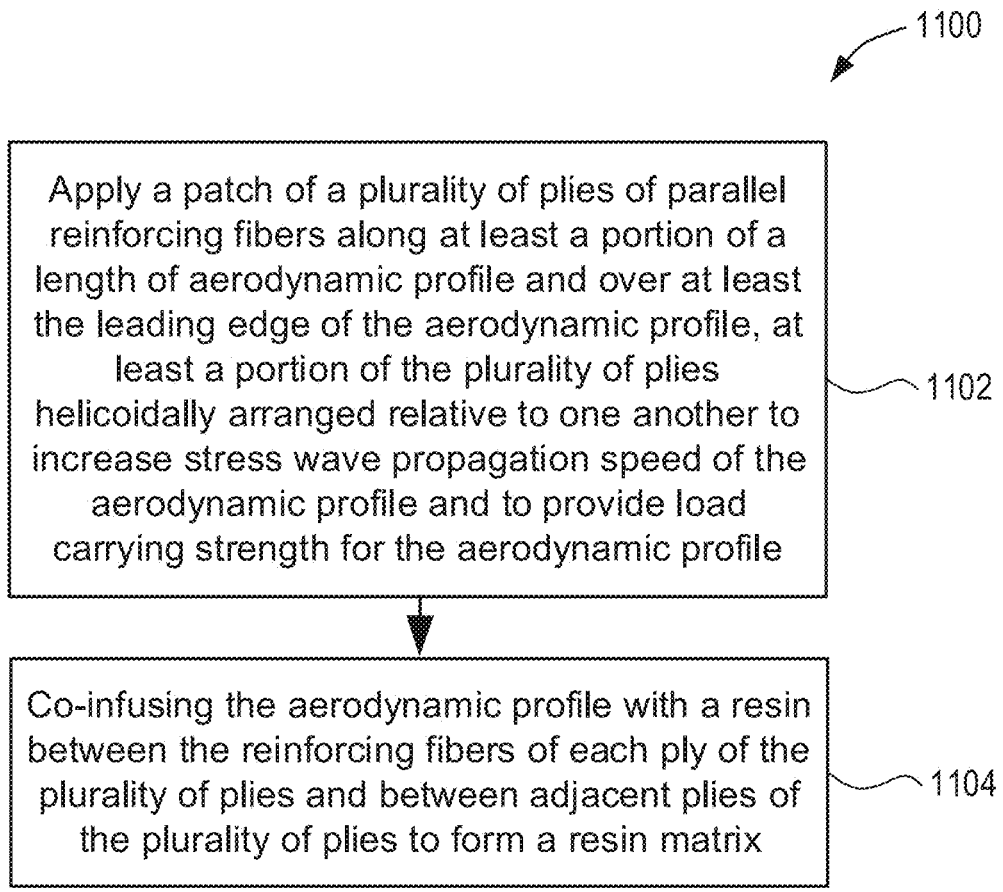
FIG. 11 is a flow chart illustrating exemplary method steps for forming an aerodynamic blade having a helicoidal architecture in accordance with the principles of the present disclosure.

Referring now to FIG. 11, exemplary method 1100 for forming an aerodynamic profile with reinforcing fiber composites having a helicoidal architecture is provided. Method 1100 may be implemented in a generic cost-effective way using manufacturing technologies and methods currently used which may be easily integrated in the manufacturing process of the aerodynamic structure to reduce complexity and to ease maintenance operations. At step 1102, a patch of a plurality of plies of parallel reinforcing fibers may be applied along at least a portion of a length of the aerodynamic profile and over at least the LE of the aerodynamic profile, such that at least a portion of the plurality of plies are helicoidally arranged relative to one another to tailor stress wave propagation speed and acoustic impedance of the aerodynamic profile and to provide load carrying strength for the aerodynamic profile. At step 1104, the aerodynamic profile may be co-infused with a resin between the reinforcing fibers of each ply of the plurality of plies and between adjacent plies of the plurality of plies to form a resin matrix. Each shell and the shear webs of the aerodynamic profile may then be assembled, e.g., via adhesive. The aerodynamic profile may then be demolded, trimmed, and polished. Alternatively, the patch of helicoidal graded material may be applied directly to the already manufactured aerodynamic profile for quick replacement and maintenance. This will also allow protection of aerodynamic profiles which are currently in operation and extend their durability and productivity.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:

1. An apparatus for protecting an aerodynamic profile having a length and a leading edge, the apparatus comprising:
a plurality of plies of parallel reinforcing fibers configured to extend along at least a portion of the length of the aerodynamic profile and over at least the leading edge of the aerodynamic profile to form a modified aerodynamic profile; and
a resin matrix comprising a resin permeated between the parallel reinforcing fibers of each ply of the plurality of plies and between adjacent plies of the plurality of plies,
wherein a first portion of the plurality of plies disposed on the aerodynamic profile is non-helicoidally arranged relative to one another to improve load-carrying strength of the aerodynamic profile, and a second portion of the plurality of plies disposed on the first portion and comprising at least four plies is helicoidally arranged relative to one another to tailor stress wave propagation speed and acoustic impedance of the aerodynamic profile and dampen high frequency impacts generated by impact on the aerodynamic profile and improve erosion resistance, and
wherein an included angle between orientation directions of each pair of adjacent plies of the second portion of the plurality of plies is more than 0° and less than about 30° to provide impact resistance for the aerodynamic profile.

2. The apparatus of claim 1, wherein the aerodynamic profile comprises a wind turbine blade, a fixed leading edge of an aircraft, an open rotor blade, a helicopter blade, a nose cone, an air intake of an engine, a pylon, a nacelle, vertical and horizontal stabilizers, a propeller blade, a fan blade, a mast, a keel, a rudder, a wing, or forward facing areas of a boat hull.

3. The apparatus of claim 1, wherein the parallel reinforcing fibers comprise unidirectional long fiber composites.

4. The apparatus of claim 1, wherein the parallel reinforcing fibers comprise a non-crimp fabric.

5. The apparatus of claim 4, wherein the non-crimp fabric comprises a biaxial configuration.

6. The apparatus of claim 4, wherein the non-crimp fabric comprises a quadriaxial configuration.

7. The apparatus of claim 4, wherein the non-crimp fabric comprises at least one of e-glass or natural fiber materials.

8. The apparatus of claim 7, wherein the natural fiber materials comprise at least one of flax, sisal, hemp, kenaf, or bamboo.

9. The apparatus of claim 1, wherein the parallel reinforcing fibers comprise at least one of carbon, glass, aramid, ultra-high-molecular-weight polyethylene (UHMWPE), polypropylene (PP), or a natural fiber.

10. The apparatus of claim 1, wherein the resin comprises at least one of a thermoset or a thermoplastic resin.

11. The apparatus of claim 1, wherein an elastic modulus of the resin is less than an elastic modulus of the parallel reinforcing fibers by at least a factor of ten.

12. The apparatus of claim 1, wherein the impact comprises at least one of rain droplets, hail, dust, ice, sand, or salt.

13. The apparatus of claim 1, wherein at least a portion of the second portion of the plurality of plies are helicoidally arranged relative to one another in a non-symmetric manner.

14. The apparatus of claim 1, wherein at least a portion of the second portion of the plurality of plies are helicoidally arranged relative to one another in an unbalanced manner.

15. The apparatus of claim 1, wherein at least a portion of the plurality of plies configured to extend over the leading edge of the aerodynamic profile comprises a pitch angle between 20 and 30 degrees.

16. The apparatus of claim 1, wherein at least one of the resin matrix, fiber reinforcement of the plurality of plies, or fiber treatment of the apparatus is selected to tailor the hardness of the modified aerodynamic profile to thereby tailor the stress wave propagation speed and acoustic impedance of the aerodynamic profile.

17. The apparatus of claim 1,
wherein an included angle between orientation directions of a first pair of adjacent plies of the first portion of the plurality of plies is 30° or more.

18. The apparatus of claim 17, wherein an included angle between orientation directions of at least one other pair of adjacent plies of the first portion of the plurality of plies is 30° or more.

19. The apparatus of claim 1, wherein the parallel reinforcing fibers of the first portion of the plurality of plies are configured to extend at an angle of 0° relative to a pitch axis of the aerodynamic profile.

20. The apparatus of claim 1, further comprising a top coating coupled to the plurality of plies.

* * * * *